United States Patent
Shukla et al.

(10) Patent No.: US 11,352,700 B2
(45) Date of Patent: Jun. 7, 2022

(54) COMPOSITIONS AND METHODS FOR FORMING ARTICLES HAVING SILVER METAL

(71) Applicant: Eastman Kodak Company, Rochester, NY (US)

(72) Inventors: Deepak Shukla, Webster, NY (US); Kevin M. Donovan, Bergen, NY (US); Dianne Marie Meyer, Hilton, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 508 days.

(21) Appl. No.: 16/411,179

(22) Filed: May 14, 2019

(65) Prior Publication Data

US 2019/0264331 A1  Aug. 29, 2019

Related U.S. Application Data

(62) Division of application No. 15/622,145, filed on Jun. 14, 2017, now Pat. No. 10,358,725.

(51) Int. Cl.

| | |
|---|---|
| *C23C 18/42* | (2006.01) |
| *H01B 1/22* | (2006.01) |
| *C08L 1/28* | (2006.01) |
| *C23C 18/18* | (2006.01) |
| *C23C 18/16* | (2006.01) |
| *C23C 18/08* | (2006.01) |
| *C23C 18/06* | (2006.01) |
| *C23C 18/20* | (2006.01) |

(Continued)

(52) U.S. Cl.
CPC ............ *C23C 18/42* (2013.01); *C08F 220/06* (2013.01); *C08L 1/284* (2013.01); *C23C 18/06* (2013.01); *C23C 18/08* (2013.01); *C23C 18/165* (2013.01); *C23C 18/1608* (2013.01); *C23C 18/1831* (2013.01); *C23C 18/1879* (2013.01); *C23C 18/2053* (2013.01); *C23C 18/30* (2013.01); *H01B 1/22* (2013.01)

(58) Field of Classification Search
CPC ..... C23C 18/42; C23C 18/06; C23C 18/1608; C23C 18/165; C23C 18/1831; C23C 18/1879; C23C 18/08; C23C 18/2053; C23C 18/30; C08F 220/06; C08L 1/284; H01B 1/22

USPC ........................................................ 252/514
See application file for complete search history.

(56) References Cited

U.S. PATENT DOCUMENTS

| | | |
|---|---|---|
| 4,622,069 A | 11/1986 | Akai et al. |
| 5,491,059 A | 2/1996 | Whitcomb |

(Continued)

OTHER PUBLICATIONS

S. Brett Walker et al., "Reactive Silver Inks for Patterning High-Conductivity Features at Mild Temperatures," *J. Am. Chem. Soc.*, Oct. 2011.

*Primary Examiner* — Taylor V Oh
(74) *Attorney, Agent, or Firm* — J. Lanny Tucker

(57) ABSTRACT

Electrically-conductive silver metal is provided in a pattern on a substrate having a first supporting side and a second opposing supporting side. One or both of the first supporting side and the second opposing supporting side has one or more electrically-conductive silver metal containing patterns containing the electrically-conductive silver metal; an α-oxy carboxylate; a 5- or 6-membered N-heteroaromatic compound; and a polymer that is either (i) a hydroxy-containing cellulosic polymer or (ii) a non-cellulosic acrylic polymer having a halo- or hydroxy-containing side chain. Such articles can be used in various devices and electrodes.

11 Claims, 5 Drawing Sheets

(51) Int. Cl.
*C23C 18/30* (2006.01)
*C08F 220/06* (2006.01)

(56) References Cited

U.S. PATENT DOCUMENTS

| | | |
|---|---|---|
| 6,468,521 B1 | 10/2002 | Pedersen et al. |
| 8,163,073 B2 | 4/2012 | Chan et al. |
| 8,226,755 B2 | 7/2012 | Chung et al. |
| 8,419,822 B2 | 4/2013 | Li |
| 9,469,773 B2 | 10/2016 | Walker et al. |
| 2010/0021704 A1 | 1/2010 | Yoon et al. |
| 2015/0004325 A1 | 1/2015 | Walker et al. |
| 2018/0362548 A1 | 12/2018 | Shukla et al. |

COMPOSITIONS AND METHODS FOR FORMING ARTICLES HAVING SILVER METAL

CROSS-REFERENCE TO RELATED APPLICATIONS

This is a divisional of U.S. Pat. No. 10,358,725.

Reference is made to the following commonly assigned patent applications and patents, the disclosures of all of which are incorporated herein by reference:

U.S. Pat. No. 9,809,606 by Shukla,
U.S. Pat. No. 10,186,342 by Shukla;
U.S. Pat. No. 10,087,331 by Shukla, Mis, Welter, Klubek, and Donovan;
U.S. Pat. No. 10,356,899 by Shukla;
U.S. Pat. No. 9,718,842 by Shukla;
U.S. Pat. No. 10,311,990 by Shukla;
U.S. Patent Publication No. 2018/0049321 by Shukla, Lenhard, Mis, and Donovan, now abandoned;
U.S. Pat. No. 10,314,173 by Shukla, Mis, Welter, and Donovan;
U.S. Pat. No. 10,214,657 by Shukla, Donovan, and Gillmor;
U.S. Pat. No. 10,870,774 by Shukla and Donovan;
U.S. Patent Publication No. 2018/0258305 by Shukla and Donovan, now abandoned; and U.S. Pat. No. 10,364,500 by Shukla, Donovan, and Meyer.

FIELD OF THE INVENTION

This invention relates to articles with electrically-conductive metallic silver thin films or patterns on a substrate can be provided using thermally sensitive non-aqueous precursor compositions containing a silver complex having reducible silver ions, a hydroxy-free, nitrile-containing aprotic solvent, and a specific type of polymer to provide electrically-conductive metallic silver upon suitable application of heat to reduce the reducible silver ions. Each complex includes one or more reducible silver ions complexed with an α-oxy carboxylate and one or more 5- or 6-membered N-heteroaromatic compounds.

BACKGROUND OF THE INVENTION

It is well known that silver as a precious metal has desirable electrical and thermal conductivity, catalytic properties, and antimicrobial behavior. Thus, silver and silver-containing compounds have been widely used in alloys, metal plating processes, electronic devices, imaging sciences, medicine, clothing or other fibrous materials, and other commercial and industrial articles and processes to take advantage of silver's beneficial properties.

For example, silver compounds or silver metal have been described for use as metallic patterns or electrodes in metal wiring patterns, printed circuit boards (PCBs), flexible printed circuit boards (FPCs), antennas for radio frequency identification (RFID) tags, plasma display panels (PDPs), liquid crystal displays (LCDs), organic light emitting diodes (OLEDs), flexible displays and organic thin film transistors (OTFTs), among other electronic devices known in the art.

Rapid advances are also occurring for making and using various electronic devices for various communication, financial, and archival purposes.

Silver is an ideal conductor having electrical conductivity 50 to 100 times greater than indium tin oxide that is commonly used today in many devices. For example, the art has described the preparation of electrically-conductive films by forming and developing (reducing) a silver halide image in "photographic" silver halide emulsions through an appropriate mask to form electrically-conductive grid networks having silver wires having average sizes (width and height) of less than 10 µm and having appropriate lengths. Various efforts have been made to design the silver halide emulsions and processing conditions to optimize electrically-conductive grid designs.

While silver as an electrical conductor has a wide range of potential uses in the field of printed electronics, the microfabrication of electrically-conductive tracks (grids, wires, or patterns) by photolithographic and electroless techniques is time consuming and expensive, and there is an industrial need for direct digital printing to simplify the processes and to reduce manufacturing costs.

Furthermore, it is desirable to fabricate silver-containing electronics onto polymeric or similar temperature-sensitive substrates by solution-based printing processes. Metallic electrically-conductive wires or grids of low resistance must be achieved at sufficiently low temperatures so as to be compatible with organic electronics on polymeric substrates. Among various known methods for fabricating electrically-conductive silver grids or patterns, the direct printing of silver-containing inks provides attractive prospects for making such electrically-conductive patterns.

Commonly used silver-conductive inks useful for this purpose are currently based or dependent upon the presence of silver nanoparticle (NP) solutions or dispersions, all of which have associated drawbacks. To overcome the common problem of aggregation and flocculation in silver nanoparticle based inks, various thiolate encapsulating surfactants or dispersants can be used. Volkman et al. [*Chem. Mater.* 23, 4634-4640 (2011)] observed that a thiolate encapsulating surfactant could be used to treat 3 nm silver particles in silver-containing inks to achieve films sintered at temperatures above 175° C. in air. Sintering is essential to obtain the electrical conductivities required for electronic applications. The effects of sintering on electrical performance and microstructure for an inkjet-printed copper nanoparticle ink were explored by Niittynen et al. [*Sci. Rep.* 5, 8832 (2015)]. These workers used laser and intense pulsed light (IPL) sintering in order to obtain articles having electrical conductivities greater than 20% of that of bulk copper.

However, sintering techniques have major disadvantages. In many cases, sintering steps require high temperatures that are not compatible with polymer substrates such as polyethylene terephthalate or polycarbonate that are commonly employed in many consumer electronic articles. Furthermore, the metal-containing inks used for these processes have disparate viscosities and synthetic parameters. Particle-based inks typically contain electrically-conductive metal particles that are synthesized separately and then incorporated into an ink formulation. Each resulting particle-based ink must then be optimized for use in a specific printing process.

Grouchko et al. [*ACS Nano* 5(4) 3354-3359 (2011)] recently overcame some of these problems by employing a room temperature, "built in" sintering mechanism that successfully produced silver metal articles exhibiting electrical conductivities as high as 41% of the electrical conductivity of bulk silver. To obtain these electrical conductivity values, a chloride salt (such as NaCl) or HCl vapor was employed to strip a polymeric (polyacrylic acid sodium salt) electrosterically stabilizing coating from the ~15 nm diameter silver nanoparticle feedstock. This sintering mechanism consisted of spontaneous coalescence and Ostwald ripening, driven by the surface-to-volume energy of the very small silver nanoparticles. Thus, all of these nanoparticle-based processes inherently involve sintering processes, whether they are chemical (for example using a strong acid such as hydrochloric acid), thermal, laser, or UV activated.

Inkjet printing and flexographic printing have also been proposed for providing patterns of silver or silver-containing compounds, requiring the careful fabrication of a silver-containing paste or "ink" with desirable surface tension, viscosity, stability, and other physical properties required for such application processes. High silver content has generally been required for high electrical conductivity, and calcination or sintering may be additionally required for increasing electrical conductivity of printed silver inks.

An alternative to the approaches described above is to employ a chemical ink formulation where the silver source is a molecular precursor or cation (such as a silver salt) that is then chemically reacted (or reduced) to produce silver metal. Electrically-conductive inks that are in the form of a chemical solution rather than as a suspension or dispersion of metal particles, have gained interest in recent years [see, for example, Walker and Lewis in *J. Am. Chem. Soc.* 134, 1419 (2012); and Jahn et al. *Chem. Mater.* 22, 3067-3071 (2010)]. One conductive ink of this type is known as a Metalorganic Decomposition (MOD) variety ink, for example, as described by Jahn et al. [*Chem. Mater.* 22, 3067-3071 (2010)] who investigated silver printing using an aqueous transition metal complex [$AgO_2C(CH_2OCH_2)_3H$]-containing MOD ink. They reported the formation of metallic silver features having electrical conductivities as high as $2.7\times10^{\prime}S\ m^{-1}$, which corresponds to an electrical conductivity that is 43% of that of bulk silver, although a sintering temperature of 250° C. was required. MOD inks thus overcome some problems associated with the use of nanoparticle-containing inks, for example, nozzle clogging, but numerous printing passes are generally required to obtain an adequate sheet resistance. Post-treatment sintering processes are also still required to fully consolidate the electrically-conductive articles if the growth process is initiated from discrete nanoparticle intermediates, which is common in MOD ink processes.

U.S. Patent Application Publication 2015/0004325 (Walker et al.) describes a chemically-reactive silver ink composition comprised of a complex of a silver carboxylate salt and an alkylamine, in which the complex is used to form an electrically-conductive silver structure at a temperature of 120° C. or less. Unfortunately, even these temperatures render the ink incompatible with many polymeric and paper substrates used in flexible electronic and biomedical devices. Furthermore, since alkylamines are known to reduce silver at room temperature, long term stability of such compositions is tentative. The complexes must be kept in air-tight refrigerated storage for extended keeping stability (Column I, paragraph 0054 of the publication). Furthermore, the publication teaches long heating times were needed to obtain low resistivity in the resulting articles.

A common coordinating ion to form organic silver complexes is carboxylic acid [*Prog. Inorg. Chem.*, 10, 233 (1968)]. However, silver-carboxylate complexes are generally insoluble in organic solvents [see, for example, U.S. Pat. No. 5,491,059 of Whitcomb and U.S. Pat. No. 5,534,312 of Hill et al.] and have a high decomposition temperature. To solve this problem, several methods have been proposed for example, in *Ang. Chem., Int. Ed. Engl.*, 31, p. 770 (1992), *Chem. Vapor Deposition*, 7, 111 (2001), *Chem. Mater.*, 16, 2021 (2004), and U.S. Pat. No. 5,705,661 (Iwakura et al.).

Among such methods are those using silver carboxylates having long alkyl chains or including amine compounds or phosphine compounds. However, the silver complexes known thus far have insufficient stability or solubility and a high decomposition temperature is needed for pattern formation and are decomposed slowly.

Allegedly to address some of these problems, U.S. Pat. No. 8,226,755 (Chung et al.) describes silver complexes formed by reacting a silver compound (such as a silver salt) with an ammonium carbamate compound or ammonium carbonate compound. Moreover, U.S. Patent Application Publication 2010/0021704 (Yoon et al.) describes the preparation and use of fatty acid silver salts complexed with amines and in admixture with silver oxide to form silver metal from the silver oxide at low temperature.

U.S. Pat. No. 8,163,073 (Chan et al.) describes the use of silver ammonium complex ions, silver amine complex ions, silver-amino acid complex ions, silver halide complex ions, silver sulfite complex ions, or silver thiosulfate complex ions for silver plating processes to form silver wires for various devices.

U.S. Pat. No. 7,682,774 (Kim et al.) describes other photosensitive compositions comprising silver fluoride-organic complex precursors as catalyst precursors as well as the use of polymer derived from a monomer having a carboxyl group and a co-polymerizable monomer that may provide polymeric stability and developability of the resulting "seed" silver catalyst particles used for electroless plating.

U.S. Pat. No. 8,419,822 (Li) describes a process for producing carboxylic acid-stabilized silver nanoparticles by heating a mixture of a silver salt, a carboxylic acid, and a tertiary amine. However, it has been observed that such silver-containing complexes are not thermally or light stable. The reducible silver ions are readily reduced under ambient light conditions, and the resulting electrical conductivity of silver particles is minimal.

Other industrial approaches to preparing electrically-conductive films or elements have been directed to formulating and applying photocurable compositions containing dispersions of metal particles such as silver metal particles to substrates, followed by curing of the photocurable components in the photocurable compositions. The applied silver particles in the cured compositions thus act as catalytic (seed) particles for electrolessly plated electrically-conductive metals. Useful electrically-conductive grids prepared in this manner are described for example, in U.S. Pat. No. 9,188,861 (Shukla et al.) and U.S. Pat. No. 9,207,533 (Shukla et al.) and in U.S. Patent Application Publications 2014/0071356 (Petcavich) and 2015/0125596 (Ramakrishnan et al.). Using these methods, photocurable compositions containing catalytic silver particles can be printed and cured on a suitable transparent substrate, for example, a continuous roll of a transparent polyester, and then electroless plating can be carried out on the catalytic silver particles. However, these methods require that high quantities of silver particles be dispersed within the photocurable compositions in a uniform manner so that coatings or printed patterns have a sufficiently high concentration of catalytic sites. Without effective dispersing, silver particles readily agglomerate, leading to less effective and uniform application of catalytic metal patterns and electroless plating.

Despite the various approaches and efforts to provide electrically-conductive silver in various consumer and industrial articles described above, there remains a need for thermally sensitive silver-generating compositions and processes which can rapidly generate metallic silver under appropriate heating conditions. Ideally, such thermally sensitive compositions should have several properties: stability at room temperature for an extended time (that is, limited self-reduction of silver ions); capability of being deposited using a wide range of application processes, whether uniformly or patternwise; useful at room temperature; and controllable chemical activity.

SUMMARY OF THE INVENTION

The present application provides a non-aqueous precursor composition consisting essentially of:

(a) a silver complex comprising one or more reducible silver ions complexed with an α-oxy carboxylate and a 5- or 6-membered N-heteroaromatic compound, the silver complex being represented by the following formula (I):

$$(Ag^+)_a(L)_b(P)_c \quad (I)$$

wherein L represents the α-oxy carboxylate; P represents the 5- or 6-membered N-heteroaromatic compound; a is 1 or 2; b is 1 or 2; and c is 1, 2, 3, or 4, provided that when a is 1, b is 1, and when a is 2, b is 2;

(b) a hydroxy-free, nitrile-containing aprotic solvent having a boiling point at atmospheric pressure of at least 100° C. and less than 500° C.; and (c) a polymer that is either (i) a hydroxy-containing cellulosic polymer or (ii) a non-cellulosic acrylic polymer having a halo- or hydroxy-containing side chain, which polymer is present in an amount of at least 0.25 weight % and up to and including 15 weight %, based on the total weight of reducible silver ions in the silver complex.

This invention also comprises a method for providing silver metal, comprising:

providing a thermally sensitive thin film or a thermally sensitive thin film pattern on a substrate, the thermally sensitive thin film or thermally sensitive thin film pattern, consisting essentially of:

(a) a silver complex comprising one or more reducible silver ions complexed with an α-oxy carboxylate and a 5- or 6-membered N-heteroaromatic compound, the silver complex being represented by the following formula (I):

$$(Ag^+)_a(L)_b(P)_c \quad (I)$$

wherein L represents the α-oxy carboxylate; P represents the 5- or 6-membered N-heteroaromatic compound; a is 1 or 2; b is 1 or 2; and c is 1, 2, 3, or 4, provided that when a is 1, b is 1, and when a is 2, b is 2;

(b) a hydroxy-free, nitrile-containing aprotic solvent having a boiling point at atmospheric pressure of at least 100° C. and less than 500° C.; and (c) a polymer that is either (i) a hydroxy-containing cellulosic polymer or (ii) a non-cellulosic acrylic polymer having a halo- or hydroxy-containing side chain, which polymer is present in an amount of at least 0.25 weight % and up to and including 10 weight %, based on the total weight of reducible silver ions in the silver complex; and thermally converting reducible silver ions in the thermally sensitive thin film or thermally sensitive thin film pattern to electrically-conductive silver metal by heating the thermally sensitive thin film or thermally sensitive thin film pattern at a temperature that is at or below the glass transition temperature of the silver complex for a time sufficient to convert at least 95 mol % of the reducible silver ions in the silver complex to silver metal, to provide an electrically-conductive silver metal-containing thin film or electrically-conductive silver metal-containing thin film pattern on the substrate, wherein the electrically-conductive silver metal-containing thin film or electrically-conductive silver metal-containing thin film pattern consists essentially of:

silver metal;

the α-oxy carboxylate;

the 5- or 6-membered N-heteroaromatic compound; and either (i) the hydroxy-containing cellulosic polymer or (ii) the non-cellulosic acrylic polymer having a halo- or hydroxy-containing side chain.

Further, a method of this invention for providing two or more electrically-conductive silver metal patterns comprises:

providing a substrate having a first supporting side and a second opposing supporting side, providing two or more thermally sensitive thin film patterns on two or more respective portions on the first supporting side of the substrate, each of the two or more thermally sensitive thin film patterns consisting essentially of:

(a) a silver complex comprising one or more reducible silver ions complexed with an α-oxy carboxylate and a 5- or 6-membered N-heteroaromatic compound, the silver complex being represented by the following formula (I):

$$(Ag^+)_a(L)_b(P)_c \quad (I)$$

wherein L represents the α-oxy carboxylate; P represents the 5- or 6-membered N-heteroaromatic compound; a is 1 or 2; b is 1 or 2; and c is 1, 2, 3, or 4, provided that when a is 1, b is 1, and when a is 2, b is 2;

(b) a hydroxy-free, nitrile-containing aprotic solvent having a boiling point at atmospheric pressure of at least 100° C. and less than 500° C.; and (c) a polymer that is either (i) a hydroxy-containing cellulosic polymer or (ii) a non-cellulosic acrylic polymer having a halo- or hydroxy-containing side chain, which polymer is present in an amount of at least 0.25 weight % and up to and including 15 weight %, based on the total weight of reducible silver ions in the silver complex;

thermally converting reducible silver ions in each of the two or more thermally sensitive thin film patterns on the first supporting side of the substrate to provide correspondingly two or more electrically-conductive silver metal-containing patterns on the first supporting side of the substrate, each electrically-conductive silver metal-containing pattern consisting essentially of:

silver metal;

the α-oxy carboxylate;

the 5- or 6-membered N-heteroaromatic compound; and either (i) the hydroxy-containing cellulosic polymer or (ii) the non-cellulosic acrylic polymer having a halo- or hydroxy-containing side chain; and optionally, drying each of the two or more electrically-conductive silver metal-containing patterns.

In some of these embodiments, the method can further comprise:

providing two or more opposing thermally sensitive thin film patterns on two or more respective portions on the second opposing supporting side of the substrate, each of the two or more opposing thermally sensitive thin film patterns comprising:

a silver complex as defined by formula (I), a hydroxy-free, nitrile-containing aprotic solvent, and a (i) or (ii) polymer;

thermally converting reducible silver ions in each of the two or more opposing thermally sensitive thin film patterns to provide two or more opposing electrically-conductive silver metal-containing patterns on the second opposing supporting side of the substrate, each of the two or more opposing electrically-conductive silver metal-containing patterns consisting essentially of:

silver metal;
the α-oxy carboxylate;
the 5- or 6-membered N-heteroaromatic compound; and
either (i) the hydroxy-containing cellulosic polymer or (ii) the non-cellulosic acrylic polymer having a halo- or hydroxy-containing side chain; and
optionally, drying each of the two or more opposing electrically-conductive silver metal-containing patterns.

In some of the methods noted above, each of the thermally sensitive thin film patterns on both the first supporting side and a second opposing supporting side consists essentially of:

silver metal;
the same α-oxy carboxylate;
the same 5- or 6-membered N-heteroaromatic compound; and
the same (i) hydroxy-containing cellulosic polymer selected from the group consisting of hydroxypropylmethyl cellulose, hydroxypropyl cellulose, hydroxyethyl cellulose, hydroxypropylmethyl cellulose, and a mixture thereof, or the same (ii) non-cellulosic acrylic polymer that is derived from one or more (meth)acrylates, at least one of which (meth)acrylates having a halo- or hydroxy-containing side chain.

Moreover, the present invention provides an article comprising a substrate having a first supporting side and a second opposing supporting side, and further comprising on one or both of the first supporting side and the second opposing supporting side:

one or more electrically-conductive silver metal containing patterns, each consisting essentially of:
silver metal;
an α-oxy carboxylate;
a 5- or 6-membered N-heteroaromatic compound; and
a polymer that is either (i) a hydroxy-containing cellulosic polymer or (ii) a non-cellulosic acrylic polymer having a halo- or hydroxy-containing side chain.

The present invention is directed to: non-aqueous precursor compositions containing a silver complex comprising a silver ion complexed with one or more α-oxy carboxylate compounds and one or more 5- or 6-membered N-heteroaromatic compounds; uses of such compositions in methods to provide electrically-conductive films or patterns; and methods for producing and using same. For example, such silver complexes can be incorporated into silver "inks" or non-aqueous precursor compositions that comprise one or more hydroxy-free, nitrile-containing aprotic solvents, and one or more polymers that are either (i) a hydroxy-containing cellulosic polymer or (ii) a non-cellulosic acrylic polymer having a halo- or hydroxy-containing side chain.

The silver complexes and non-aqueous precursor compositions containing same can be used in various methods comprising the silver "ink" as a uniform thermally sensitive thin film or as a thermally sensitive thin film pattern on a substrate, and heating the applied material at suitable temperature and for a suitable time to generate electrically-conductive silver metal (uniform layer or pattern) from most or all the original reducible silver ions.

As the non-aqueous precursor compositions described herein are generally in the form of clear liquids, it is possible to choose a wide array of deposition techniques when producing various articles and uses, including but not limited to flexographic printing, ink jet printing, screen printing, gravure printing, roll-to-roll coating, spraying, and other techniques that would be readily apparent to one skilled in the art.

The advantages described herein are achieved with the use of unique silver complexes with either the (i) or (ii) polymers described herein. Each complex comprises at least one reducible silver ion that is complexed with at least one α-oxy carboxylate, and at least one 5- or 6-membered N-heteroaromatic compound.

Other advantages of the present invention would be readily apparent to one skilled in the art in view of the teaching provided herein.

DETAILED DESCRIPTION OF THE INVENTION

Figure 1:
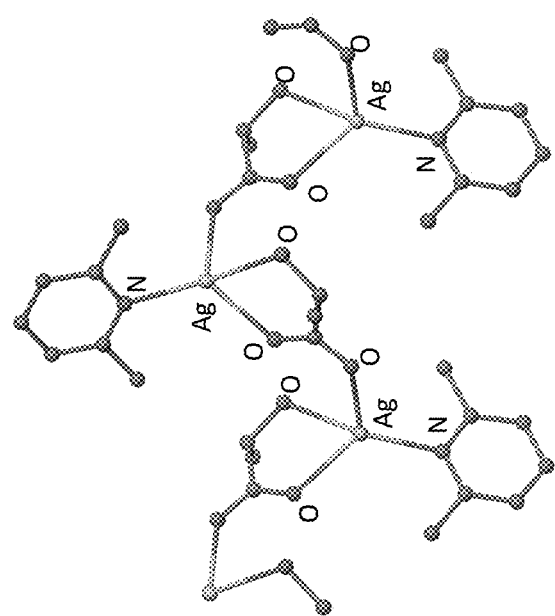
FIG. 1 is an illustration of the crystal structure of a silver ion-containing complex as described in I-1 below.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described in the discussion of any embodiment.

Definitions

As used herein to define various components of the non-aqueous precursor compositions, thermally sensitive thin films, thermally sensitive thin film patterns, or other materials used in the practice of the present invention, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted to have a standard dictionary meaning.

The use of numerical values in the various ranges specified herein, unless otherwise expressly indicated otherwise, are to be considered as approximations as though the minimum and maximum values within the stated ranges were both preceded by the word "about." In this manner, slight variations above and below the stated ranges may be useful to achieve substantially the same results as the values within the ranges. In addition, the disclosure of these ranges is intended as a continuous range including every value between the minimum and maximum values as well as the end points of the ranges.

Unless otherwise indicated, the term "weight %" refers to the amount of a component or material based on the total amount of a non-aqueous precursor composition, formulation, solution. In other embodiments, "weight %" can refer to the % solids (or dry weight) of a dry layer, coating, thin film, silver wire, or silver pattern.

Unless otherwise indicated herein, the terms "silver complex," "silver ion-containing complex," and "complex" refer to materials used according to the present invention.

Unless otherwise indicated herein, the terms "non-aqueous precursor composition", "thermally sensitive composition" and "thermally sensitive reducible silver ion-containing composition" refer to embodiments of the present invention.

Unless otherwise indicated herein, "thermal sensitivity" refers to the ability for silver ions to be reduced to silver metal in a complex or thermally sensitive composition when heated at or above its glass transition temperature.

Glass transition temperature, for example of the silver complexes described herein can be measured using known principles and a commercially available instrument from, for example, TA Instruments, Perkin-Elmer, and Mettler Toledo.

Unless otherwise indicated, the term "non-aqueous" as applied to the non-aqueous precursor composition or other solutions means that solvent media used to form such compositions or solutions are predominantly organic in nature and water is not purposely added but may be present in an amount of less than 10 weight %, or particularly less than 5 weight %, or even less than 1 weight %, of the total weight of all solvents in the solvent medium.

The average dry thickness of thermally sensitive thin films and silver metal-containing thin films described herein can be the average of at least 2 separate measurements taken, for example, using electron microscopy, optical microscopy, or profilometry.

Similarly, the average dry thickness or width of silver metal (including silver) lines, grid lines, or other silver metal-containing thin film pattern features described herein can be the average of at least 2 separate measurements taken, for example, using electron microscopy, optical microscopy, or profilometry.

The use of "dry" in reference to thickness and width refers to embodiments in which at least 50 weight % of originally present solvent(s) has been removed.

For clarification of definitions for any terms relating to polymers, reference should be made to "Glossary of Basic Terms in Polymer Science" as published by the International Union of Pure and Applied Chemistry ("IUPAC"), *Pure Appl. Chem.* 68, 2287-2311 (1996). However, any definitions explicitly set forth herein should be regarded as controlling.

As used herein, the term "polymer" is used to describe compounds with relatively large molecular weights formed by linking together many small reacted monomers. As the polymer chain grows, it folds back on itself in a random fashion to form coiled structures. With the choice of solvents, a polymer can become insoluble as the chain length grows and become polymeric particles dispersed in the solvent medium. These particle dispersions can be very stable and useful in the non-aqueous precursor compositions according to the present invention. In this invention, unless indicated otherwise, the term "polymer" refers to a non-crosslinked material. Thus, crosslinked polymeric particles differ from the non-crosslinked polymeric particles in that the latter can be dissolved in certain organic solvents of good solvating property whereas the crosslinked polymeric particles may swell but do not dissolve in the organic solvent because the polymer chains are connected by strong covalent bonds.

The term "copolymer" refers to polymers composed of two or more different repeating or recurring units that are arranged along the copolymer backbone.

The term "polymer backbone" refers to the chain of atoms in a polymer to which a plurality of pendant groups can be attached. An example of such a polymer backbone is an "all carbon" backbone obtained from the polymerization of one or more ethylenically unsaturated polymerizable monomers. Some polymer backbones can comprise both carbon and heteroatoms if the polymer is formed using condensation polymerization reactions using suitable reactants.

Recurring units in polymeric binders described herein are generally derived from the corresponding ethylenically unsaturated polymerizable monomers used in a polymerization process, which ethylenically unsaturated polymerizable monomers can be obtained from various commercial sources or prepared using known chemical synthetic methods.

As used herein, the term "ethylenically unsaturated polymerizable monomer" refers to a compound comprising one or more ethylenically unsaturated (—C═C—) bonds that are polymerizable using free radical or acid-catalyzed polymerization reactions and conditions. It is not meant to refer to chemical compounds that have only unsaturated —C═C— bonds that are not polymerizable under these conditions.

Unless otherwise indicated, the term "group" particularly when used to define a substituent or a moiety, can itself be substituted or unsubstituted (for example an "alkyl group" refers to a substituted or unsubstituted alkyl group) by replacement of one or more hydrogen atoms with suitable substituents (noted below) such as a fluorine atom. Generally, unless otherwise specifically stated, substituents on any "groups" referenced herein or where something is stated to be possibly substituted, include the possibility of any groups, whether substituted or unsubstituted, which do not destroy properties necessary for expected utility. It will also be understood for this disclosure and claims that reference to a compound or complex of having a general structure includes those compounds of other more specific formula that fall within the general structural definition. Examples of substituents on any of the mentioned groups can include known substituents such as: halogen (for example, chloro and fluoro); alkoxy, particularly those with 1 to 5 carbon atoms (for example, methoxy and ethoxy); substituted or unsubstituted alkyl groups, particularly lower alkyl groups (for example, methyl and trifluoromethyl), particularly either of those having 1 to 6 carbon atoms (for example, methyl, ethyl, and t-butyl); and other substituents that would be readily apparent in the art.

Unless otherwise indicated, all voltages described herein are measured versus SCE (saturated calomel electrode).

Uses

The deposition or patterning of functional electrodes, pixel pads, and conductive traces, lines, and tracks, which meet electrical conductivity, processing, and cost requirements for practical applications have been a great challenge. Silver metal is of interest in electrically-conductive elements for electronic devices because silver is much lower in cost than gold and it possesses much better environmental stability than copper.

The non-aqueous precursor compositions according to the present invention can be used for forming electrically-conductive metallic silver patterns and electrodes for example in membrane touch switches (MTS), battery testers, biomedical, electroluminescent lamps, radio frequency identification (RFID) antenna, flat panel displays such as plasma display panel (PDP) and organic light emitting diode (OLED) displays, printed transistors and thin film photovoltaics, and thereby reduce the numbers of steps for pattern formation in such devices.

The non-aqueous precursor compositions described herein can be used to provide silver metal for various purposes, including but not limited to, the formation of electrically-conductive grids or patterns of fine wires or other geometric forms, the formation of silver seed particles for electroless plating with other electrically-conductive metals, and the formation of silver in various materials for antimicrobial activity.

More specifically, the silver complexes described herein are particularly useful as part of non-aqueous precursor compositions that can be heated to provide silver metal in electrically-conductive metal thin films or metal patterns. These electrically-conductive metal thin films or patterns can be incorporated into various devices including but not limited to, touch screens or other transparent display devices, and in modern electronics such as solar cell electrodes, electrodes in organic thin film transistors (OTFTs), flexible displays, radio frequency identification tags, light antennas, and other devices that would be readily apparent to one skilled in the art from the teaching herein.

The silver metal formed according to the present invention can also be used as catalytic sites for electrochemical plating using silver or other metals to improve electrically-conductivity of the resulting metal thin films or patterns.

Silver Complexes

The useful silver complexes are designed with only three essential components: (1) one or two reducible silver ions complexed with both (2) one or two α-oxy carboxylate molecules, and (3) one, two, three, or four 5- or 6-membered N-heteroaromatic compound molecules, which components are described below.

In general, each useful silver complex can be represented by the following formula (I):

$(Ag^+)_a(L)_b(P)_c$  (I)

wherein L represents the α-oxy carboxylate; P represents the 5- or 6-membered N-heteroaromatic compound; a is 1 or 2; b is 1 or 2; and c is 1, 2, 3, or 4, provided that when a is 1, b is 1, and when a is 2, b is 2.

In some embodiments:
a and b are both 1 and c is 1 or 2;
(ii) a and b are both 2 and c is 2; or
(iii) a and b are both 2 and c is 4.

In addition, each silver complex according to the present invention has at minimum solubility in a non-hydroxylic solvent (as defined below) or at least 5 g/liter at atmospheric pressure and ambient temperature (15° C. to 25° C.). It is particularly useful that this solubility feature is measured in acetonitrile that is one of the more useful hydroxy-free, nitrile-containing solvents.

Moreover, each silver complex of formula (I) can be defined using oxidation potentials determined separately for the component parts, such that the "P" component that is a 5- or 6-membered N-heteroaromatic compound having an oxidation potential of at least 1.0 V, at least 1.5 V, or even at least 2.0 V vs. SCE; the "L" component, that is, the α-oxy carboxylate, has a first oxidation potential of at least 1.0 V vs. SCE; and upon decarboxylation of the α-oxy carboxylate, a second radical is generated that has an oxidation potential of less than 1.0 V vs. SCE. More specifically, the 5- or 6-membered N-heteroaromatic compound has an oxidation potential of greater than 1.5 V vs. SCE.

Further details of such properties are provided below.

It is very important that the silver complexes exhibit significant stability over time in that each silver complex meets a silver ion stability test such that when it is kept for 24 hours at ambient temperature (15-25° C.) and under yellow safelight, less than 0.1 mol % of the original silver ion content in the silver complex is reduced to silver metal (as tested by chemical analysis and UV-Vis absorption spectroscopy).

Silver (Ag) Ions:

Each of the silver complexes comprises one or two reducible silver ions, that is, one or two $Ag^+$ or $Ag^{+1}$ ions, as a first essential component. Each reducible silver ion is complexed with one or two α-oxy carboxylate compounds. The complexation with an α-oxy carboxylate compound could be via two oxygen atoms provided from the same molecule of an α-oxy carboxylate compound, or oxygen atoms provided from two molecules of the same or different α-oxy carboxylate compounds.

Each silver complex of formula (I) shown above can be defined using reduction potentials such that the $Ag^{+1}$ ion of the silver complex can have a reduction potential of less than 1.0 V vs. SCE; or the $Ag^{+1}$ ion of the silver complex can have a reduction potential of less than 0.5 V vs. SCE; or the $Ag^{+1}$ ion of the silver complex can have a reduction potential of less than 0 V vs. SCE.

Silver ions can be provided using any suitable silver salt, and as described below, they can be provided as part of a silver carboxylate salt in which the carboxylate is an α-oxy carboxylate [L component in formula (I)].

α-Oxy Carboxylates:

A second essential component of the silver complexes includes one or more α-oxy carboxylate groups (moieties or components) in which the α-carbon atom attached directly to the carboxyl group [—C(=O)O-] has a hydroxy group, oxy, or an oxyalkyl substituent group. Thus, the α-oxy carboxylates can be either α-hydroxy carboxylates, α-alkoxy carboxylates, or α-oxy carboxylates. With the α-hydroxy carboxylates and α-alkoxy carboxylates, the remainder of the valences of that α-carbon atom can be filled with hydrogen or a branched or linear alkyl group (substituted or unsubstituted) as described below in more detail. The α-oxy carboxylates can be supplied to prepare the silver complexes as the corresponding free carboxylic acids or as corresponding alkali metal or ammonium salts.

In addition, the α-oxy carboxylate (L) generally has a molecular weight of 250 or less, or 150 or less, and it likely has a molecular weight of at least 75 and up to and including 150.

It is important to note that the carboxylate groups in the silver complexes are not simple alkyl and aryl carboxylates that lack the hydroxyl, alkoxy, or oxy group at the α-position.

In formula (I) shown above, b is 1 or 2, and in the embodiments where b is 2, the two α-oxy carboxylate compounds within a single silver complex molecule can be the same or different compounds. For example, the two α-oxy carboxylate compounds can be provided as two of the same molecules represented by either formula (II) or (III) as described below. Alternatively, the two α-oxy carboxylate compounds can be provided by two different molecules represented by formula (II), two different molecules represented by formula (III), or one molecule represented by formula (II) and one molecule represented by formula (III).

In some embodiments, L of formula (I) described above can be represented by the following formula (II):

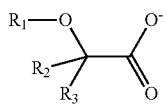

wherein $R_1$, $R_2$, and $R_3$ are independently hydrogen or branched or linear alkyl groups. In most embodiments, at least one of $R_1$ through $R_3$ is a branched or linear alkyl group having from 1 to 8 carbon atoms, and any of the hydrogen atoms in such branched or linear alkyl groups can be replaced with a heteroatom such as a fluorine atom substituent.

In particularly useful embodiments of formula (II), $R_1$ is hydrogen or a branched or linear alkyl group having 1 to 3 carbon atoms (that is, substituted or unsubstituted methyl, ethyl, n-propyl, and iso-propyl), and $R_2$ and $R_3$ are independently branched or linear alkyl groups having 1 to 8 carbon atoms (including iso- and tertiary alkyl groups having 3 to 8 carbon atoms). In some embodiments, $R_2$ and $R_3$ are different branched or linear alkyl groups as defined above. In addition, any of the hydrogen atoms in any of the $R_1$, $R_2$, and $R_3$ branched or linear alkyl groups optionally can be replaced with a fluorine atom; for example, the terminal carbon atom of a branched or linear alkyl group can have 1 to 3 fluorine atoms.

Some particularly useful conjugate acids from which α-oxy carboxylates (L) of formula (II) can be selected from the group consisting of lactic acid, 2-hydroxybutyric acid, 2-hydroxy-3-methylbutyric acid, 2-hydroxy-3,3-dimethylbutyric acid, 2-hydroxy-isobutyric acid, 2-hydroxy-2-methylbutyric acid, 2-ethyl-2-hydroxybutyric acid, 2-hydroxy-2,3-dimethylbutyric acid, 2-ethyl-2-methoxybutyric acid, 2-methoxy-2-methylpropanoic acid, 1-hydroxycyclopentane-1-carboxylic acid, 2,3-dihydroxy-2,3-dimethylsuccinic acid, and 2,4-dihydroxy-2,4-dimethylpentanedioic acid. As noted above, mixtures of these materials can be used in a specific silver complex if desired.

In other embodiments of the present invention, L is represented in formula (I) by the following formula (III):

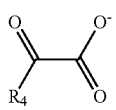

wherein $R_4$ is a branched or linear alkyl group having 1 to 8 carbon atoms, including branched iso- and tertiary alkyl groups having 3 to 8 carbon atoms. In addition, any of the hydrogen atoms in any of the branched or linear alkyl groups optionally can be replaced with a fluorine atom; for example, the terminal carbon atom of an $R_4$ branched or linear alkyl group can have 1 to 3 fluorine atoms.

Some useful conjugate acids from which the α-oxy carboxylate (L) represented by formula (III) can be selected from the group consisting of pyruvic acid, 3-methylpyruvic acid, 3,3-dimethylpyruvic acid, 3,3-dimethyl-2-oxobutanoic acid, 3,3-dimethyl-2-oxopentanoic acid, and 2,3-dioxosuccinic acid. Such materials can be readily obtained from various commercial sources.

Some helpful understanding of the electrochemical behavior of the L groups in formula (I) is as follows in order to understand this essential component of the silver complex.

Upon oxidation, the α-oxy carboxylate identified in formula (II) undergoes decarboxylation to produce a radical K. that can undergo further oxidation as shown in the following Equation (1):

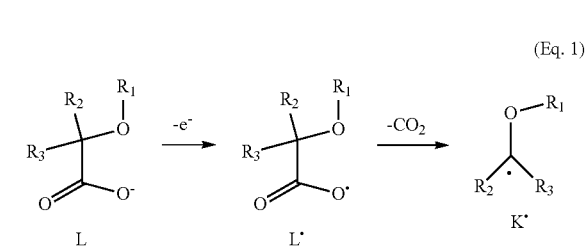

(Eq. 1)

As noted herein, the silver complex can be characterized as having one or more molecules of two components complexed with the silver ion: namely the α-oxy carboxylate compound and a nitrogen-containing P compound as defined below. The chemical structural features of all of P, $R_1$, $R_2$, and $R_3$ determine the oxidation potential of L ($E_{ox1}$) whereas $R_1$, $R_2$, and $R_3$ determine the oxidation potential of the radical K.($E_{ox2}$).

An α-oxy carboxylate compound of the silver complex is capable of transferring two electrons to the reducible silver ion. The first electron comes from oxidation of the α-oxy carboxylate to generate an α-oxy carboxyl radical L. that undergoes a bond cleavage reaction (decarboxylation) to give off $CO_2$ and to produce a second radical K. that can also desirably transfer a second electron to the reducible silver ion.

Thus, L can be a fragmentable α-oxy carboxylate wherein:

(1) L has a first oxidation potential of at least 1 V and up to and including 2 V (or for example, at least 1.2 V and up to and including 2 V);

(2) the oxidized form of L undergoes a bond cleavage reaction to provide the second radical K. and $CO_2$; and (3) the second radical K. has an oxidation potential ≤+1V (that is, equal to or more negative than +1V), and even less than or equal to 0.5V.

α-Oxy carboxylates that satisfy criteria (1) and (2) above but not criterion (3) are capable of donating one electron to the reducible silver ion and are referred to herein as "fragmentable one-electron donors." However, α-oxy carboxylates that meet all three criteria are capable of donating two electrons and are referred to herein as "fragmentable two-electron donors," and such components are particularly useful to provide a faster reduction of the silver ions.

Fragmentation of the oxidized form of L that is, α-oxy carboxyl radical L., is an important feature in the silver metal-producing methods according to the present invention. The kinetics of the fragmentation reaction can be measured by laser flash photolysis, a well-known technique used to study properties of transient species as described for example in "Absorption Spectroscopy of Transient Species," W. G. Herkstroeter and I. R. Gould in Physical Methods of Chemistry Series (2nd Ed.), Volume 8, 225-319, edited by B. Rossiter and R. Baetzold, John Wiley & Sons, New York, 1993. The rate constant of fragmentation of the α-oxy carboxylate radical is desirably faster than about $10^9$ per second (that is, the lifetime of the α-oxy carboxylate radical should be $10^{-9}$ seconds or less). The fragmentation rate constants can be considerably higher than this, namely in the $10^2$ to $10^{13}$ s$^{-1}$ range. In particular, the fragmentation rate constant is desirably greater than $10^9$ s$^{-1}$ and up to and including $10^{13}$ s$^{-1}$, or from $10^{10}$ s$^{-1}$ to and including $10^{13}$ s$^{-1}$. Fragmentation rate constants for some carboxylate radicals are known in the literature [for example see, T. Michael Bockman, Stephan M. Hubig, and Jay K. Kochi, J. Org. Chem. 1997, 62, 2210-2221; James W. Hilborn and James A. Pincock, J. Am. Chem. Soc. 1991, 113, 2683-2686; Daniel E. Falvey and Gary B. Schuster, J. Am. Chem. Soc. 1986, 108, 1420-1422]. Fragmentation rate constants for some α-hydroxy carboxyl radicals have also been measured using laser flash photolysis and found to be very fast, that is $8 \times 10^{11}$ s$^{-1}$ (see, T. Michael Bockman, Stephan M. Hubig, and Jay K. Kochi, J. Org. Chem. 1997, 62, 2210-2221). Since fragmentation rates of simple alkyl and aryl carboxyl radicals are usually small (about $10^8$ to $10^9$ s$^{-1}$), such simple alkyl and aryl carboxylates are not useful in the practice of the present invention.

The ability of the second radical K. described above to reduce silver ion indicates that the oxidation potential of K. is nearly equal to or more negative than the reduction potential of silver ion in the silver complex. In some useful embodiments, the second radical K., resulting from the decarboxylation reaction has an oxidation potential equal to or more negative than −0.1 V or even more negative than −0.5 V. For example, this oxidation potential can be from −0.1 V to and including −2 V, or even from −0.5 V to and including −2 V, or more likely from −0.1 V to and including −1.0 V. In accordance with present invention, an α-oxy carboxylate ion that provides a second radical K. having an oxidation potential more negative than −0.1 V is particularly advantageous. All oxidation potentials are vs. SCE.

The oxidation potential of many such second radicals have been measured by transient electrochemical and pulse radiolysis techniques as reported by Wayner, D. D., McPhee, D. J., and Griller, D. in J. Am. Chem. Soc. 1988, 110, 132; Rao, P. S. and Hayon, E. in J. Am. Chem. Soc. 1974, 96, 1287 and Rao, P. S., and Hayon, E. in J. Am. Chem. Soc. 1974, 96, 1295. The reported data demonstrate that the oxidation potentials of tertiary radicals are less positive (that is, the tertiary radicals are stronger reducing agents) than those of the corresponding secondary radicals, which in turn are more negative than those of the corresponding primary radicals.

5- or 6-Membered N-Heteroaromatic Compounds:

A third essential component of the silver complexes according to the present invention is the "P" compound of formula (I), which is a 5- or 6-membered N-heteroaromatic compound. In many embodiments, P is a 6-membered N-heteroaromatic compound.

Such 5- or 6-membered N-heteroaromatic compounds generally have an oxidation potential of at least 1.0 V vs. SCE, or greater than 1.5 V vs. SCE, or of at least 2.0 V vs. SCE.

It is also desirable that each 5- or 6-membered N-heteroaromatic compound has a pK$_a$ of at least 10 and up to and including 22, or more typically of at least 10 and up to and including 15, as measured in acetonitrile. An experimental method for measuring pK$_a$ and the pK$_a$ values of some N-heteroaromatic bases are known (for example, see Kalijurand et al. J. Org. Chem. 2005, 70, 1019).

In general, the 5- or 6-membered N-heteroaromatic compounds are not polymeric in nature and each has a molecular weight of 200 or less, or of 150 or less, or more likely of at least 80 and up to and including 150.

By "5- or 6-membered," it is meant that the N-heteroaromatic compound has either 5 or 6 atoms in the heterocyclic aromatic ring, at least one of which atoms is a nitrogen atom. A worker of ordinary skill in the art of chemistry would be able to design any of the heteroaromatic rings that are possible using the laws of chemistry. In general, such heterocyclic aromatic rings generally have at least one carbon atom and at least one nitrogen atom in the ring.

In formula (I) shown above, c is 1, 2, 3, or 4, and in the embodiments where c is 2, 3, or 4, the multiple 5- or 6-membered N-heteroaromatic compound molecules within the single silver complex molecule can be the same or different. For example, in such embodiments, one or more of the 5- or 6-membered N-heteroaromatic compounds can be pyridine and other 5- or 6-membered N-heteroaromatic compound(s) can be 2-methylpyridine.

Moreover, it is desirable that the 5- or 6-membered N-heteroaromatic compound is selected from the group consisting of pyridine, 2-methylpyridine, 4-methylpyridine, 2,6-dimethylpyridine, 2,3-dimethylpyridine, 3,4-dimethylpyridine, 4-pyridylacetone, 3-chloropyridine, 3-fluoropyridine, oxazole, 4-methyloxazole, isoxazole, 3-methylisoxazole, pyrimidine, pyrazine, pyridazine, and thiazole. Other useful 5- or 6-membered N-heteroaromatic compounds would be readily apparent to one skilled in the art from the foregoing description.

Representative 5- or 6-membered N-heteroaromatic compounds can be readily obtained from various commercial chemical suppliers located in various countries.

Method of Making Complexes:

In general, the silver complexes can be prepared by making a slurry of one or more silver α-oxy carboxylates in suitable solvent medium comprising one or more hydroxy-free, nitrile-containing aprotic solvents (described below) at a general concentration of at least 0.1 mol/l and to and including 30 mol/l; and at room temperature, adding either one or more 5- or 6-membered N-heteroaromatic compounds gradually to obtain a clear solution in the resulting reaction solution. Specific details for these synthetic methods are provided below with the working Examples below.

Once prepared, the silver complexes can be stored in the form of solid (after the solvent medium is removed by evaporative methods), or left in the reaction solution under conditions that are optimum for long-term stability (that is, negligible premature reduction of silver ion to silver metal).

Some particularly useful silver complexes prepared the present invention are represented by formula (I):

$$(Ag^+)_a(L)_b(P)_c \qquad (I)$$

wherein:

a, b, and c are as defined above;

L has a molecular weight of 250 or less, and is represented by either of the following formula (II) or (III):

wherein $R_1$ is hydrogen or an alkyl group having 1 or 2 carbon atoms; $R_2$ and $R_3$ are independently branched or linear alkyl groups having 1 to 8 carbon atoms, wherein any of the hydrogen atoms in the $R_1$, $R_2$, and $R_3$ branched or linear alkyl groups can optionally be replaced with a fluorine atom; and $R_4$ is a branched or linear alkyl group having 1 to 8 carbon atoms, wherein any of the hydrogen atoms optionally are replaced with fluoride atoms; and P is a 5- or 6-membered N-heteroaromatic compound that is selected from the group consisting of pyridine, 2-methylpyridine, 4-methylpyridine, 2,6-dimethylpyridine, 2,3-dimethylpyridine, 3,4-dimethylpyridine, 4-pyridylacetone, 3-chloropyridine, 3-fluoropyridine, oxazole, 4-methyloxazole, isoxazole, 3-methylisoxazole, pyrimidine, pyrazine, pyridazine, and thiazole.

Non-Aqueous Precursor Compositions

The non-aqueous precursor compositions contain only three essential components for the purpose of providing silver metal during a thermal silver reduction process: (a) one or more silver complexes as described above; (b) a solvent medium comprising one or more hydroxy-free, nitrile-containing aprotic solvents as described below; and (c) one or more (i) or (ii) polymers as described below. Photosensitizers are not needed in the practice of the present invention. No other components are purposely added to the non-aqueous precursor compositions so that they are simple solutions that exhibit rapid silver metal formation for various methods and results. The incorporation of materials other than the three components (a), (b), and (c) is likely to impede the generation of metallic silver.

The (a), (b), and (c) components can be put together in general by mixing them under "safe light" (yellow light) conditions at room temperature. This mixing can occur in suitable solvent medium (as described below) comprising one of more of the (b) solvents. The resulting non-aqueous precursor composition can be provided in liquid form having a viscosity of at least 1 centipoise and up to and including 1,000 centipoises at 25° C.

The one or more silver complexes can be present in an amount to provide reducible silver ions in an amount of at least 30 weight % and up to and including 90 weight %, or more likely reducible ions in an amount of at least 40 weight % and up to and including 75 weight %, based on the total weight of the non-aqueous precursor composition.

In some embodiments, the non-aqueous precursor composition can comprise two or more different silver complexes as defined by Structure (I) above.

The non-aqueous precursor composition can exhibit long term stability as demonstrated by a reducible silver ion stability test such that when the non-aqueous precursor composition is held at ambient temperature (20° C. to 25° C.) and under yellow safelight for 24 hours, less than 0.1 mol % of its original silver ion content is reduced to silver metal. The extent of silver reduction can be confirmed by the presence or absence of silver plasmon band (at about 400 nm) by UV-vis absorption spectroscopy. The appearance and strength of this silver plasmon band indicates the formation and concentration of silver nanoparticles.

Solvent Medium:

The essential silver complex is generally solubilized in a suitable solvent medium that consists essentially of one or more hydroxy-free, nitrile-containing aprotic solvents that include but are not limited to, acetonitrile, benzonitrile, butyronitrile, propionitrile, isovaleronitrile, valeronitrile, and a mixture of two or more of such organic solvents. It is also desirable that such organic solvents do not participate in any redox reaction. That is, such organic solvents should not be capable under general preparation, storage, and use conditions to reduce silver ion by transferring electrons or to oxidize an α-oxy carboxylate to accept electrons. Such reactions would negatively impact the thermal stability of the non-aqueous precursor compositions.

Water is not purposely added to the solvent medium, and if water is present, it should be present at no more than 5 weight % based on the total weight of the solvent medium.

(i) and (ii) Polymers:

A third essential component is one or more polymers that fall into either of two classes of polymers defined below. It is also possible that mixtures of polymers from each class, or mixtures of polymers from both classes, can be used. When used in mixtures, the two or more different (i) or (ii) [or both (i) and (ii)] classes of polymers can be present in the same or different amounts within the total amount polymers in the non-aqueous precursor composition The useful (i) polymers are hydroxy-containing cellulosic polymers. Both hydroxy-containing cellulose esters and hydroxy-containing cellulose ethers can be used in the present invention. Representative useful polymers for the practice of the present invention include but are not limited to, hydroxypropyl methylcellulose, hydroxypropyl cellulose phthalate, hydroxypropyl cellulose, hydroxyethyl cellulose, and combinations thereof. Hydroxypropyl methylcellulose, hydroxypropyl cellulose, and hydroxyethyl cellulose, individually or in mixtures, are particularly useful.

Each of the useful (i) hydroxy-containing cellulosic polymers can be readily obtained from various commercial sources in the world, or they can be prepared using known starting materials, reaction conditions, and known synthetic procedures.

Useful (ii) polymers are generally non-cellulosic acrylic polymers derived from one or more ethylenically unsaturated polymerizable monomers that are substituted or unsubstituted acrylates or substituted or unsubstituted methacrylates, collectively identified herein as "(meth)acrylates." It is also essential that such (meth)acrylates comprise one or more halo-containing or hydroxy-containing side chains. In other words, the ethylenically unsaturated polymerizable monomers from which the (ii) polymers can be derived generally comprise at least one pendant group attached to the polymerizable vinylic group that contains a hydroxy group or a halo group (such as a fluoro, chloro, or bromo group). Both hydroxy groups and halo groups can be present in the same ethylenically unsaturated polymerizable monomer if desired.

A variety of ethylenically unsaturated polymerizable monomers can be used to provide the (ii) polymers as homopolymers or copolymers. Representative monomers having either a hydroxy-group or a halo-group in a pendant moiety include but are not limited to, vinyl acetate, vinyl butyrate, vinyl propionate, hydroxyethyl acrylate, hydroxyethyl methacrylate, hydroxypropyl acrylate, hydroxypropyl methacrylate, chloroethyl acrylate, chloroethyl methacrylate, 1-chloropropyl acrylate, and others that would be readily apparent to one skilled in the art. Such monomers can also be co-polymerized with other ethylenically unsaturated polymerizable (meth)acrylates that do not contain a halo or hydroxy group, such as for example, methyl methacrylate, methyl acrylate, ethyl methacrylate, n-propyl methacrylate, n-butyl methacrylate, and others that would be readily apparent to one skilled in the art.

In the resulting (ii) polymer, the recurring units comprising the halo-containing side chain, hydroxy-containing side chain, or both types of side chains, can comprise at least 25 mol %, or even at least 60 mol %, and up to and including 100 mol % of the total recurring units.

Some of the (ii) polymers can be readily purchased from various commercial sources, or they can be readily prepared using readily available or prepared starting monomers, initiators, and solvents using known polymerization and isolation techniques.

The one or more (i) or (ii) polymers described herein can be present in the non-aqueous precursor composition in a total amount of at least 0.25 weight % and up to and including 15 weight %, or more likely of at least 2 weight % and up to and including 15 weight %, or even at least 2 weight % and up to and including 12 weight %, based on the total weight of reducible silver ions in the silver complex.

Precursor Articles

The silver complexes and non-aqueous precursor compositions described herein can be used to provide "precursor" articles that can then be used in various operations to provide electrically-conductive silver metal-containing thin film layers or electrically-conductive silver metal-containing thin film patterns for various uses in "product articles" as described below.

The term "precursor article" refers to an article (or element) designed to have a substrate having thereon a thermally sensitive thin film or thermally sensitive thin film pattern comprising a non-aqueous precursor composition as noted above and thus, is thus an article in which silver reduction has not occurred to any appreciable extent.

The term "product article" then refers to an article (or element) in which silver ion reduction has occurred to at least some extent and hopefully to a significant extent (for example, at least 80 mol % or even at least 95 mol % conversion of the original reducible silver ions in the precursor article) during chosen operations as described below. Such product articles comprise a substrate having thereon a silver metal-containing thin film or silver metal-containing thin film pattern consisting essentially of silver metal, residual α-oxy carboxylate, residual 5- or 6-membered N-heteroaromatic compound, and residual one or more (i) or (ii) polymers.

Both precursor articles and product articles have at least one feature in common, that is a suitable substrate that generally has two planar surfaces: a first supporting side (or surface) and a second opposing supporting side (or surface). Such substrates can have any suitable form such as sheets of any desirable size and shape, elongated fibers or woven fibers (such as in textiles) or other porous materials, polymeric beads of regular or irregular surface configuration (such as a curved or non-planar surface), and especially continuous webs of various materials that can be supplied, used, or stored as rolls.

More specifically, a uniform thermally sensitive thin film or one or more thermally sensitive thin film patterns are provided in a suitable manner on one or more supporting (planar) sides of a suitable substrate to provide a precursor article. Typically, thermally sensitive thin films or thermally sensitive thin film patterns are initially "wet" during and immediately after application to the substrate but the solvent medium can be removed as described below to provide the desired thermally sensitive thin films or thermally sensitive thin film pattern(s).

The non-aqueous precursor compositions can be applied in a uniform or pattern-wise manner to any suitable substrate using any means for application, such as dip coating, roll coating, hopper coating, screen printing, spray coating, spin coating, inkjet printing, photolithographic imprinting, flexographic printing using printing elements including flexographic printing members (such as flexographic printing plates and flexographic printing sleeves), lithographic printing using lithographic printing plates, and gravure or intaglio printing using appropriate printing members. Inkjet printing and flexographic printing are particularly useful for providing thermally sensitive thin film patterns on one or both supporting sides of the substrate.

Suitable substrates (also known as "receiver elements") can be composed of any suitable material that does not inhibit the purpose of the present invention to form electrically-conductive silver metal within a uniform thin film or thin film pattern. For example, substrates can be formed from materials including but are not limited to, polymeric films, metals, glasses (untreated or treated for example with tetrafluorocarbon plasma, hydrophobic fluorine, or a siloxane water-repellant material), silicon or ceramic materials such as ceramic wafers, fabrics, papers, and combinations thereof (such as laminates of various films, or laminates of papers and films) provided that a uniform thin film or thin film pattern can be formed thereon in a suitable manner and followed by irradiation on at least one supporting side thereof. The substrate can be transparent or opaque, and rigid or flexible. The substrate can include one or more auxiliary polymeric or non-polymeric layers or one or more patterns of other materials before the non-aqueous precursor composition is applied.

Suitable substrate materials for forming precursor and product articles prepared according to the present invention include but are not limited to, metallic films or foils, metallic films on polymer, glass, or ceramic materials, metallic films on electrically conductive film supports, semi-conducting organic or inorganic films, organic or inorganic dielectric films, or laminates of two or more layers of such materials. For example, useful substrates can include polymeric films such as poly(ethylene terephthalate) films, poly(ethylene naphthalate) films, polyimide films, polycarbonate films, polyacrylate films, polystyrene films, polyolefin films, and polyamide films, silicon and other ceramic materials, metal foils such as aluminum foils, cellulosic papers or resin-coated or glass-coated papers, glass or glass-containing composites, metals such as aluminum, tin, and copper, and metalized films. Porous fabrics, glasses, and polymeric webs can also be used.

Particularly useful substrates are glasses and ceramics, and continuous flexible webs of polyesters films.

Either or both supporting sides (or surfaces) of the substrate can be treated for example with a primer layer or electrical or mechanical treatments (such as graining) to render that surface "receptive" to improve adhesion of the non-aqueous precursor composition and resulting silver-containing thin film or silver-containing thin film pattern. An adhesive layer can be disposed on the substrate and this adhesive layer can have various properties in response to stimuli (for example, it can be thermally activated, solvent activated, or chemically activated) and that serves to provide a receptive layer. Useful adhesive materials of this type are described for example in [0057] of U.S. Patent Application 2008/0233280 (Blanchet et al.).

In some embodiments, the substrate comprises a separate receptive layer as a receptive surface disposed on the supporting side of the substrate, which receptive layer and substrate can be composed of a material such as a suitable polymeric material that is highly receptive of the non-aqueous precursor composition. Such a receptive layer can have any suitable dry thickness of at least 0.05 μm when measured at 25° C.

The two (planar) supporting sides of the substrate, especially polymeric substrates, can be treated by exposure to corona discharge, mechanical abrasion, flame treatments, or oxygen plasmas, or by coating with various polymeric films, such as poly(vinylidene chloride) or an aromatic polysiloxane as described for example in U.S. Pat. No. 5,492,730 (Balaba et al.) and U.S. Pat. No. 5,527,562 (Balaba et al.) and U.S. Patent Application Publication 2009/0076217 (Gommans et al.).

Useful substrates can have a desired dry thickness depending upon the eventual use of the product article formed therefrom, for example, its incorporation into various products articles or optical or display devices. For example, the substrate dry thickness (including all treatments and auxiliary layers) can be at least 0.001 mm and up to and including 10 mm, and especially for polymeric films, the substrate dry thickness can be at least 0.008 mm and up to and including 0.2 mm.

The substrate used to prepare the precursor and product articles described herein can be provided in various forms, such as for example, individual sheets in any size or shape, and continuous webs such as continuous webs of transparent substrates including transparent polyester substrates that are suitable for roll-to-roll operations. Such continuous webs can be divided or formed into individual first, second, and additional portions on first and second opposing supporting sides that can be used to form the same or different thermally sensitive thin film patterns in different portions of a supporting side (such as the first supporting sides) as well as same or different thermally reduced, electrically-conductive silver-containing thin film patterns from the same or different non-aqueous precursor compositions.

In general, in the precursor article, the one or more silver complexes can be present in the thermally sensitive thin film or the one or more thermally sensitive thin film patterns in a total amount of at least 95 weight % and up to and including 99.5 weight % based on the total dry weight of the thermally sensitive thin film or the one or more thermally sensitive thin film patterns.

In some embodiments, a precursor article can further comprise one or more dry thermally sensitive thin film patterns on the second opposing supporting side of the substrate, each of the one or more dry thermally sensitive thin film patterns disposed on the second opposing supporting side, comprising:

a) one or more silver complexes as described above; and
c) one or more (i) or (ii) polymers as described above.

Product Articles

The product articles provided by the methods according to the present invention described below generally have the same structure and components as the precursor articles except that most or all of the reducible silver ions have been reduced to electrically-conductive silver metal in the corresponding electrically-conductive thin films or electrically-conductive thin film patterns. The product articles can be provided in any suitable form such as individual sheets of any suitable size and shape, films or webs whose ends are attached to each other, wound rolls of continuous material with or without a core material, spindle, or mandrel.

In other embodiments, where silver complexes, non-aqueous precursor compositions, and methods can be used to generate electrically-conductive metallic silver patterns and electrodes within various devices, including but not limited to, membrane touch switch (MTS), battery testers, biomedical, electroluminescent lamps, radio frequency identification (RFID) antenna, electromagnetic shields, flat panel displays such as plasma display panel (PDP) and organic light emitting diode (OLED) display, printed transistors and circuits, thin film photovoltaics, and other devices that would be readily apparent to one skilled in the art. In other words, such "product" articles are devices themselves rather than articles that are incorporated into a device. Alternatively, the product articles are devices themselves that also have another product article incorporated therein.

Electrically-conductive thin film patterns can be created using photolithography to create high-fidelity features. Both positive and negative patterning processes may be used to create such patterns.

Such product articles comprise a substrate having a first supporting side and a second opposing supporting side. On at least the first supporting side, are:

an electrically-conductive silver metal-containing thin film or one or more electrically-conductive silver metal-containing thin film patterns, consisting essentially of:

silver metal;

residual α-oxy carboxylate (residual amounts of the L component from formula (1)) as described above;

residual 5- or 6-membered N-heteroaromatic compound (residual amounts of the P component from formula (1)); and residual (i) or (ii) polymer as described herein.

Depending upon how the precursor article is designed, the product article can comprise two or more electrically-conductive silver metal-containing thin film patterns in different portions on the first supporting side of the substrate.

In addition, a product article can further comprise one or more electrically-conductive silver metal-containing thin film patterns in different portions on the second opposing supporting side of the substrate, each of these one or more electrically-conductive silver metal-containing thin film patterns consisting essentially of:

silver metal;

residual α-oxy carboxylate (that is, residual amounts of the L component of formula (1) as described above);

residual 5- or 6-membered N-heteroaromatic compound (that is, residual amounts of the P component of formula (1) described above); and residual (i) or (ii) polymer as described herein.

For example, in such embodiments, the product articles can consist essentially of:

silver metal;

residual α-oxy carboxylate having a molecular weight of 150 or less, and that is represented by either the following formula (II) or (III):

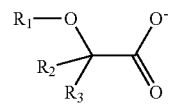

(II)

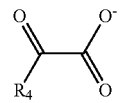

(III)

wherein $R_1$ is hydrogen or a branched or linear alkyl group having 1 to 3 carbon atoms, $R_2$ and $R_3$ are independently branched or linear alkyl groups having 1 to 8 carbon atoms, wherein any of the hydrogen atoms in the $R_1$, $R_2$, and $R_3$ branched or linear alkyl groups optionally can be replaced with a fluorine atom, and $R_4$ is a branched or linear alkyl group having 1 to 8 carbon atoms wherein any of the hydrogen atoms optionally can be replaced with a fluorine atom;

residual 5- or 6-membered N-heteroaromatic compound that is selected from the group consisting of pyridine, 2-methylpyridine, 2,6-dimethylpyridine, 3-chloropyridine, 3-fluoropyridine, oxazole, 4-methyloxazole, isoxazole, 3-methylisoxazole, pyrimidine, pyrazine, pyridazine, and thiazole; and residual hydroxypropyl cellulose, hydroxyethyl cellulose, hydroxypropyl methylcellulose, or mixtures thereof, or residual polymers derived from one or more (meth)acrylates, at least one of which (meth)acrylates having a halo- or hydroxy-containing side chain.

Method for Providing Silver Metal

The precursor articles are prepared and used by firstly providing a suitable thermally sensitive thin film (or thermally sensitive thin film pattern) on a substrate as described above. This can be accomplished in several ways.

In some embodiments, a non-aqueous precursor composition according to the present invention can be disposed in a uniform manner onto one or both supporting sides of the substrate (with or without adhesion treatments), such as a polymeric film (for example, as a continuous polyester web), glass, paper, cardboard, or ceramic material Such composition application can be carried out for example, uniform inkjet printing or using a blade coating, gap coating, slot die coating, spin coating, X-slide hopper coating, or knife on roll operation.

The one or more silver complexes can be present in the dry thermally sensitive thin film or thermally sensitive thin film pattern in an amount of at least 95 weight % and up to and including 99.5 weight % based on the total dry weight of the thermally sensitive thin film or thermally sensitive thin film pattern.

The resulting thermally sensitive thin films generally have a dry average thickness of at least 100 nm and up to and including 1,500 nm, or more likely at least 500 nm and up to and including 1000 nm ("average" determined by two or more measurements in different locations). The dry thickness can vary to some degree throughout the thermally sensitive thin film. The term "uniform" in this context does not necessary mean that the dry thickness must always be the same, but that the entire surface of the supporting side of the substrate is completely covered.

Alternative to depositing the non-aqueous precursor composition in a uniform manner, it can be applied to the substrate (one or both supporting sides) in a patternwise fashion using patterning techniques described below such as flexographic printing or inkjet printing to provide one or more thermally sensitive thin film patterns.

Any applied thermally sensitive thin film pattern can comprise a grid of lines (or other shapes including circles or an irregular network), each having a dry average thickness (or width) of at least 1000 nm and up to and including 10 mm, or typically of at least 5 µm and up to and including 1 mm, and the optimal dry thickness (or width) can be tailored for an intended use.

In some embodiments, the same or different non-aqueous precursor composition can be applied in a suitable manner in different portions on both the first supporting side and the second opposing supporting side of the substrate to form "duplex" or dual-sided precursor articles, and each applied non-aqueous precursor composition can be in the form of the same or different thermally sensitive thin film pattern.

In many embodiments, a non-aqueous precursor composition is applied on one or both supporting sides of the substrate (for example as a roll-to-roll web) using a relief element such as elastomeric relief elements derived from flexographic printing plate precursors, many of which are known in the art and some are commercially available, for example as the CYREL® Flexographic Photopolymer Plates from DuPont and the Flexcel SR and NX Flexographic plates from Eastman Kodak Company.

Particularly useful elastomeric relief elements are derived from flexographic printing plate precursors and flexographic printing sleeve precursors, each of which can be appropriately imaged (and processed if needed) to provide the relief elements for "printing" suitable thermally sensitive thin film patterns as described for example, in U.S. Pat. No. 7,799,504 (Zwadlo et al.) and U.S. Pat. No. 8,142,987 (Ali et al.) and U.S. Patent Application Publication 2012/0237871 (Zwadlo), the disclosures of all of which are incorporated herein by reference for details of such flexographic printing member precursors.

In other embodiments, the elastomeric relief element is provided from a direct (or ablation) laser-engravable elastomer relief element precursor, with or without integral masks, as described for example in U.S. Pat. No. 5,719,009 (Fan), U.S. Pat. No. 5,798,202 (Cushner et al.), U.S. Pat. No. 5,804,353 (Cushner et al.), U.S. Pat. No. 6,090,529 (Gelbart), U.S. Pat. No. 6,159,659 (Gelbart), U.S. Pat. No. 6,511,784 (Hiller et al.), U.S. Pat. No. 7,811,744 (Figov), U.S. Pat. No. 7,947,426 (Figov et al.), U.S. Pat. No. 8,114,572 (Landry-Coltrain et al.), U.S. Pat. No. 8,153,347 (Veres et al.), U.S. Pat. No. 8,187,793 (Regan et al.), and U.S. Patent Application Publications 2002/0136969 (Hiller et al.), 2003/0129530 (Leinenback et al.), 2003/0136285 (Telser et al.), 2003/0180636 (Kanga et al.), and 2012/0240802 (Landry-Coltrain et al.), the disclosures of all of which are incorporated herein.

When the noted elastomeric relief elements are used in the present invention, the thermally sensitive reducible silver ion-containing composition can be applied in a suitable manner to the uppermost relief surface (raised surface) in the elastomeric relief element. Application to a substrate can be accomplished in a suitable procedure and it is desirable that as little as possible is coated onto the sides (slopes) or recesses of the relief depressions. Anilox roller systems or other roller application systems, especially low volume Anilox rollers, below 2.5 billion cubic micrometers per square inch (6.35 billion cubic micrometers per square centimeter) and associated skive knives can be used.

In such embodiments, the non-aqueous precursor composition can have a viscosity during this application of at least 1 cps (centipoise) and up to and including 5000 cps, or at least 1 cps to and up to and including 1500 cps. The non-aqueous precursor composition can be fed from an Anilox or other roller inking system in a measured amount for each printed precursor article.

Once the thermally sensitive thin films or thermally sensitive thin film patterns are provided, such precursor articles can be then appropriately heated at a temperature that is at or below the glass transition temperature of the silver complex for a time sufficient to convert at least 90 mol % (or even at least 95 mol %) of the original reducible silver metal ions to silver metal. It is desirable to carry out this heating in ambient atmosphere (for example, in air) to provide product articles comprising silver metal-containing thin films or one or more silver metal-containing thin film patterns. Such heating can be carried out in a desired temperature directly, or it can be carried out in a step-wise manner wherein the temperature is slowly ramped up from room temperature over a desired time to the desired final temperature. With routine experimentation, a skilled worker can determine the optimal time and temperature for the desired thermal reduction of the reducible silver ions.

Each precursor article can be heated individually as a single element, or in alternative embodiments, as a web (for example, a roll-to-roll continuous web) containing multiple precursor articles in multiple portions of the continuous web that is passed through exposure stations, or the heating device is passed over the continuous web. The same or different non-aqueous precursor compositions can be applied (for example, printed) on both supporting sides of the substrate whether it is in the form of a single element or continuous web. In many embodiments, different thermally sensitive thin film patterns can be formed on opposing supporting sides of the substrate (or continuous web).

The result of such thermal exposure of a precursor article is a product article as described above comprising the substrate (for example, individual sheets or a continuous web) and having thereon either an electrically-conductive silver metal-containing thin film or one or more electrically-conductive silver metal-containing thin film patterns on one or both supporting sides of the substrate.

In general, the electrically-conductive silver metal-containing thin film or electrically-conductive silver-containing thin film patterns has a resistivity of less than $10^6$ ohms/□ as measured using a 4-point probe device. Each electrically-conductive silver-containing thin film or electrically-conductive silver-containing thin film pattern can have a resistivity of less than 1000 ohms/□, or a resistivity of less than 500 ohm/□, or even less than 10 ohms/□.

After thermal exposure, the product articles can be contacted (washed) with water for up to 5 minutes at a temperature of at least 20° C. and up to and including 90° C. Such water contacting can be used to remove impurities as well as to enhance electrical conductivity of the electrically-conductive silver metal-containing thin film or one or more electrically-conductive silver metal-containing thin film patterns. Residual water can be removed after this step using any suitable drying operation, for example as described above for other drying operations.

When such a method is carried out, all thermally sensitive thin film patterns on both the first supporting side and the second opposing supporting side of the continuous substrate can be provided using the same or different flexographic printing members.

The following Examples are provided to illustrate the practice of this invention and are not meant to be limiting in any manner.

Most reagents and solvents used in the following Examples can be obtained from various commercial sources such as VWR, Sigma-Aldrich Chemical Co. (Milwaukee, Wis., USA) and Fisher Scientific (Pittsburgh, Pa., USA).

C-1: Preparation of Silver Isobutyrate Pyridine Complex:

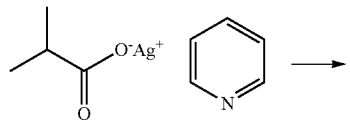

To a slurry of silver isobutyrate (1 g, 5.18 mmol) in acetonitrile (4 ml), pyridine (0.41 g, 5.18 mmol) was added and the resulting reaction mixture was stirred at 25° C. until a clear solution was obtained. The clear reaction solution was then stirred for 10 minutes and acetonitrile was slowly removed at room temperature to obtain a white solid of the desired silver isobutyrate pyridine complex that was characterized by $^1$H NMR (CD$_3$CN).

Attempted Thermal Generation of Electrically-Conductive Silver Metal Using Silver Isobutyrate Pyridine Complex:

The silver isobutyrate pyridine complex noted above (0.4 g) was dissolved in acetonitrile (1 ml). The resulting photosensitive silver ion-containing composition was spin coated onto a glass plate substrate at 800 rpm and the resulting precursor article with thin film on the glass substrate was heated on a hot plate at 150° C. for 10 minutes. The sheet resistivity of the resulting printed metallic silver features was measured using a 4-point probe device and found to be non-electrically conductive. The thin film resistivity did not change after washing it with a brine (sodium chloride) solution (0.1 molar) for 10 seconds.

This example demonstrates that upon heating, the silver ion-containing composition comprising a complex formed from reducible silver ions, an alkyl carboxylate, and a 5- or 6-membered N-heteroaromatic compound generates a film of electrically-conductive silver metal.

I-1: Preparation of Silver Lactate 2,6-Dimethylpyridine Complex:

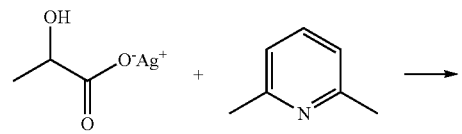

To a slurry of silver lactate (1.0 g, 5.076 mmol) in acetonitrile (4 ml), 2,6-dimethylpyridine (0.54 g, 5.08 mmol) was added and the reaction mixture was stirred to obtain a clear reaction solution. The resulting reaction solution was stirred at 25° C. for 10 minutes and acetonitrile was slowly removed at room temperature to obtain a white solid of the desired silver lactate 2,6-dimethylpyridine complex having the crystal structure as shown in FIG. 1 and confirmed by $^1$H NMR (CD$_3$CN).

I-2: Preparation of Silver Lactate 2,4,6-Trimethylpyridine Complex:

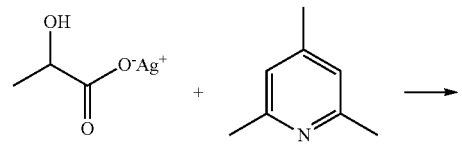

Figure 2:
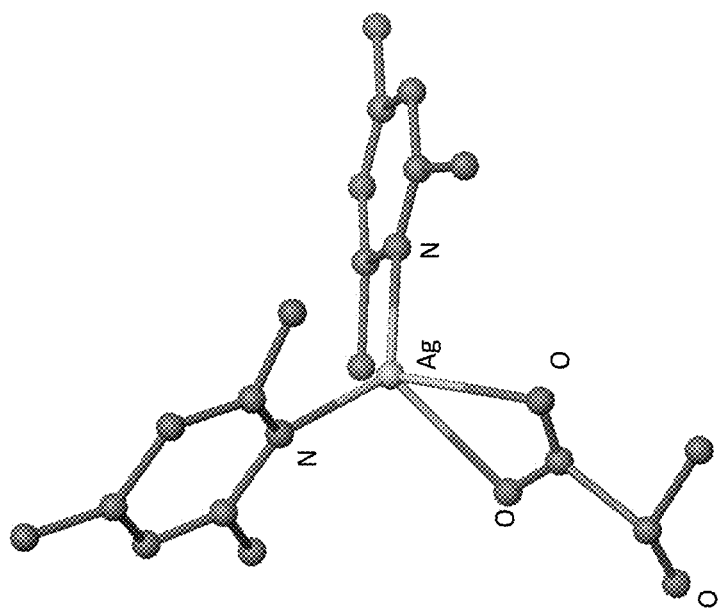
FIG. 2 is an illustration of the crystal structure of a silver ion-containing complex as described in I-2 below.

To a slurry of silver lactate (1.0 g, 5.08 mmol) in acetonitrile (5 ml), 2,4,6-trimethylpyridine (0.609 g, 5.08 mmol) was added and the resulting reaction solution was stirred at 25° C. for 10 minutes. The acetonitrile was slowly removed at room temperature to obtain a white solid of the desired silver lactate 2,4,6-dimethylpyridine complex having the crystal structure as shown in FIG. 2 and confirmed by $^1$H NMR (CD$_3$CN).

I-3: Preparation of Silver Lactate 3-Chloropyridine Complex:

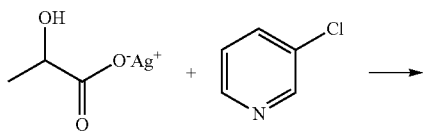

To a slurry of silver lactate (1.0 g, 5.08 mmol) in acetonitrile (5 ml), 3-chloropyridine (1.72 g, 15.24 mmol) was added and the resulting reaction solution was stirred at 25° C. for 10 minutes. The acetonitrile was slowly removed at room temperature to obtain a white solid of the desired silver lactate 3-chloropyridine complex as confirmed by $^1$H NMR (CD$_3$CN).

I-4: Preparation of Silver 2-Hydroxyisobutyrate Pyridine Complex:

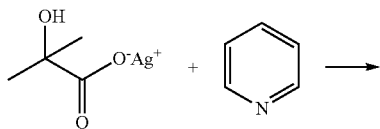

Silver 2-hydroxyisobutyrate was prepared as follows. A solution of 50% sodium hydroxide solution (58.8 g; 0.735 moles) was added to 1.05 liter of chilled (15° C.) deionized (DI) water employing mechanical stirring and external cooling at 15° C. 2-Hydroxyisobutyric acid (78.1 g; 0.750 moles) was added in portions, maintaining the resulting reaction solution temperature near or below ambient temperature. After this addition, the homogeneous reaction solution was stirred at 15° C. for 30 minutes to ensure complete reaction. Silver nitrate (127.4 g; 0.75 mole) in deionized water (187.5 ml) was slowly added to the sodium 2-hydroxyisobutyrate solution over 10 minutes. During the addition, a precipitate formed. The reaction solution was stirred at 15° C. for 30 minutes, and the slurry was filtered (medium frit size 90) and washed with water (50 ml). The collected solid was further washed with two 200 ml portions of acetone and air dried to provide the desired product of silver 2-hydroxyisobutyrate at 60% yield.

To a slurry of the formed silver 2-hydroxyisobutyrate (1 g, 4.76 mmol) in acetonitrile (5 ml), pyridine (0.75 g, 9.52 mmol) was added to obtain a clear reaction solution that was stirred for an additional 10-15 minutes at 25° C. and the acetonitrile was slowly removed at room temperature to obtain a white solid of the desired silver 2-hydroxyisobutyrate pyridine complex as confirmed by $^1$H NMR (CD$_3$CN) δ 8.56 (m, 2H), 7.8 (m, 1H), 7.4 (m. 2H), 1.40 (s, 6H).

I-5: Preparation of Silver 2-Hydroxyisobutyrate 2,6-Dimethylpyridine Complex:

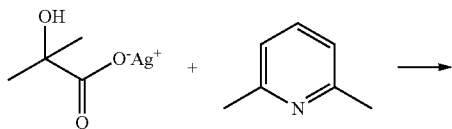

To a slurry of silver 2-hydroxyisobutyrate (1.0 g, 4.76 mmol) in acetonitrile (5 ml), 2,6-dimethylpyridine (1.01 g, 9.52 mmol) was added to obtain a clear reaction solution that was then stirred for additional 10-15 minutes at 25° C. and the acetonitrile was slowly removed at room temperature to obtain a white solid of the desired silver 2-hydroxyisobutyrate pyridine complex as confirmed by $^1$H NMR (CD$_3$CN) δ 7.6 (m, 1H), 6.9 (m, 2H), 2.5 (s 6H), 1.40 (s, 6H).

I-6: Preparation of Silver 2-Ethyl-2-hydroxybutyrate Pyridine Complex:

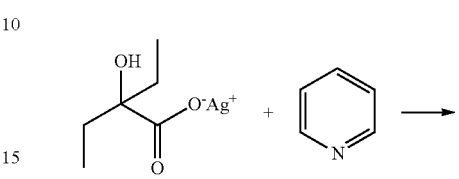

Silver 2-ethyl-2-hydroxybutyrate was prepared as follows. A solution of 50% sodium hydroxide solution (58.8 g; 0.735 moles) is added to 1.05 liter chilled (15° C.) deionized (DI) water employing mechanical stirring and external cooling at 15° C. 2-Ethyl-2-ethyl-2-hydroxybutyric acid (97.02 g; 0.750 moles) was added in portions maintaining the resulting reaction solution temperature near or below ambient temperature. After this addition, the homogenous mixture is stirred at 15° C. for 30 minutes to ensure complete reaction. Silver nitrate (127.4 g; 0.75 mole) in deionized water (187.5 ml) was slowly added to the sodium 2-hydroxyisobutyrate solution over 10 minutes. During the addition, a precipitate formed. The reaction solution was stirred at 15° C. for 30 minutes, slurry filtered (medium frit size 90), and washed water (50 ml). The collected solid was further washed with two 200 ml portions of acetone and air dried to provide the desired silver 2-ethyl-2-hydroxybutyrate product at 60% yield.

Figure 3:
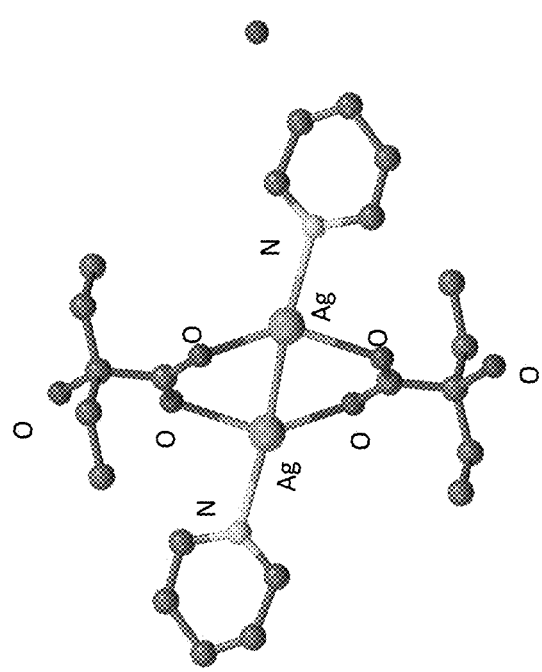
FIG. 3 is an illustration of the crystal structure of a silver ion-containing complex as described in I-6 below.

To a slurry of silver 2-ethyl-2-hydroxybutyrate (1.0 g, 4.18 mmol) in acetonitrile (5 ml), pyridine (0.661 g, 8.37 mmol) was added and the reaction solution was stirred at 25° C. for 10 minutes. The acetonitrile was slowly removed at room temperature to obtain a white solid of the desired silver 2-ethyl-2-hydroxybutyrate pyridine complex having the crystal structure shown in FIG. 3 as confirmed by $^1$H NMR (CD$_3$CN).

I-7: Preparation of Silver 2-Hydroxyisobutyrate Oxazole Complex:

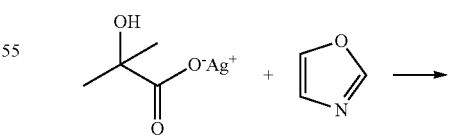

To a slurry of silver 2-hydroxyisobutyrate (1.0 g, 4.76 mmol) in acetonitrile (4 ml), oxazole (0.50 g, 19.2 mmol) was added to obtain a clear reaction solution. The reaction solution was stirred at 25° C. for 10 minutes to obtain the desired silver 2-hydroxyisobutyrate oxazole complex as confirmed by $^1$H NMR (CD$_3$CN) δ 8.08 (s, 1H), 7.90 (s, 1H), 7.21 (s. 1H), 1.2 (s, 6H).

I-8: Preparation of Silver Lactate 3-Fluoropyridine Complex:

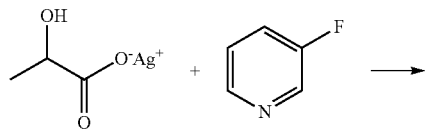

To a slurry of silver lactate (1.0 g, 5.08 mmol) in acetonitrile (5 ml), 3-fluoropyridine (1.97 g, 20.3 mmol) was added to obtain a clear reaction solution that was stirred at 25° C. for 10 minutes and the desired silver lactate 3-fluoropyridine complex was characterized by 1H NMR (CD$_3$CN) δ 8.27 (d, 1H), 8.39 (d, 1H), 7.46 (d. 1H), 7.30 (d 1H), 4 (q, 1H), 1.35 (d, 3H).

I-9: Preparation of Silver 2-Hydroxyisobutyrate 3-Fluoropyridine Complex:

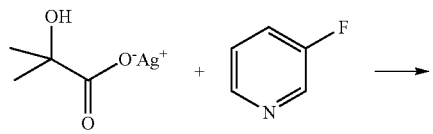

To a slurry of silver 2-hydroxyisobutyrate (1.0 g, 4.18 mmol) in acetonitrile (5 ml), 3-fluoropyridine (1.62 g, 16.72 mmol) was added to obtain a clear reaction solution that was stirred at 25° C. for 10 minutes to obtain the desired silver 2-hydroxyisobutyrate 3-fluoropyridine complex, the structure of which was confirmed by $^1$H NMR (CD$_3$CN) δ 8.25 (d, 1H), 8.35 (d, 1H), 7.4 (d. 1H), 7.3 (d 1H), 1.35 (d, 6H).

I-10: Preparation of Silver 2-Hydroxyisobutyrate 2-Methylpyrimidine Complex:

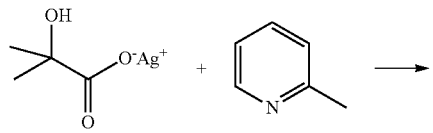

To a slurry of silver 2-hydroxyisobutyrate (1.0 g, 4.76 mmol) in acetonitrile (4 ml), 2-methylpyrimidine (1.8 g, 19.2 mmol) was added to obtain a clear reaction solution that was stirred at 25° C. for 10 minutes to obtain the desired silver 2-hydroxyisobutyrate 2-methylpyrimidine complex the structure of which was confirmed by $^1$H NMR analysis.

I-11: Electrochemical Characterization of Silver-Ion Complexes:

The electrochemical properties of various silver-containing complexes as defined above using formula (I) were assessed by the common method of cyclic voltammetry as described for example in "Electrochemical Methods, Fundamentals and Applications," A. Bard and L. Faulkner (Editors), John Wiley & Sons, Inc. NY (1980). In this method, each complex was dissolved at a concentration of about 1 to about 5 mmol in acetonitrile solvent containing 0.1 molar tetrabutylammonium-tetrafluoroborate as an electrolyte. Cyclic voltammetry was performed in a two-compartment glass cell equipped with a glassy carbon working electrode, a platinum counter electrode, and a saturated calomel (SCE) reference electrode. The SCE was separated from the main compartment of the cell by a salt bridge filled with 0.1 molar tetrabutylammonium-tetrafluoroborate electrolyte. The glassy carbon electrode was polished using 1 μm alumina paste prior to each voltammetric scan. Measurements were conducted at 25° C. using a potential sweep rate of 0.1 V/sec.

A typical cyclic voltammogram of the silver 2-hydroxyisobutyrate pyridine complex prepared as shown above is shown in FIG. 4 wherein, the electrode potential is cycled between the limits of −0.5 V and +2.0 V starting in a negative-going direction from an initial potential of +0.5 V. Three electrochemically active regions were identified. The observed current "wave" in the negative potential region from +0.1 V to −0.5 V is associated with the electrochemical reduction of the silver ion-containing complex. This reduction process results in the plating of silver metal onto the carbon electrode. The sharp current wave observed in the positive potential region from +0.1 V to +0.5 V corresponds to the oxidation of the plated silver metal to form a soluble silver ion. The sharp symmetrical shape of the latter electrochemical oxidation wave is fully consistent with the oxidation dissolution ("stripping") of silver metal from the electrode surface. Finally, a third, broad electrochemical wave in the positive potential region from about +1.0 V to +2.0 V is assigned to the overlapping oxidation waves of the incorporated component parts ("P" and "L") of the complex.

Figure 4:
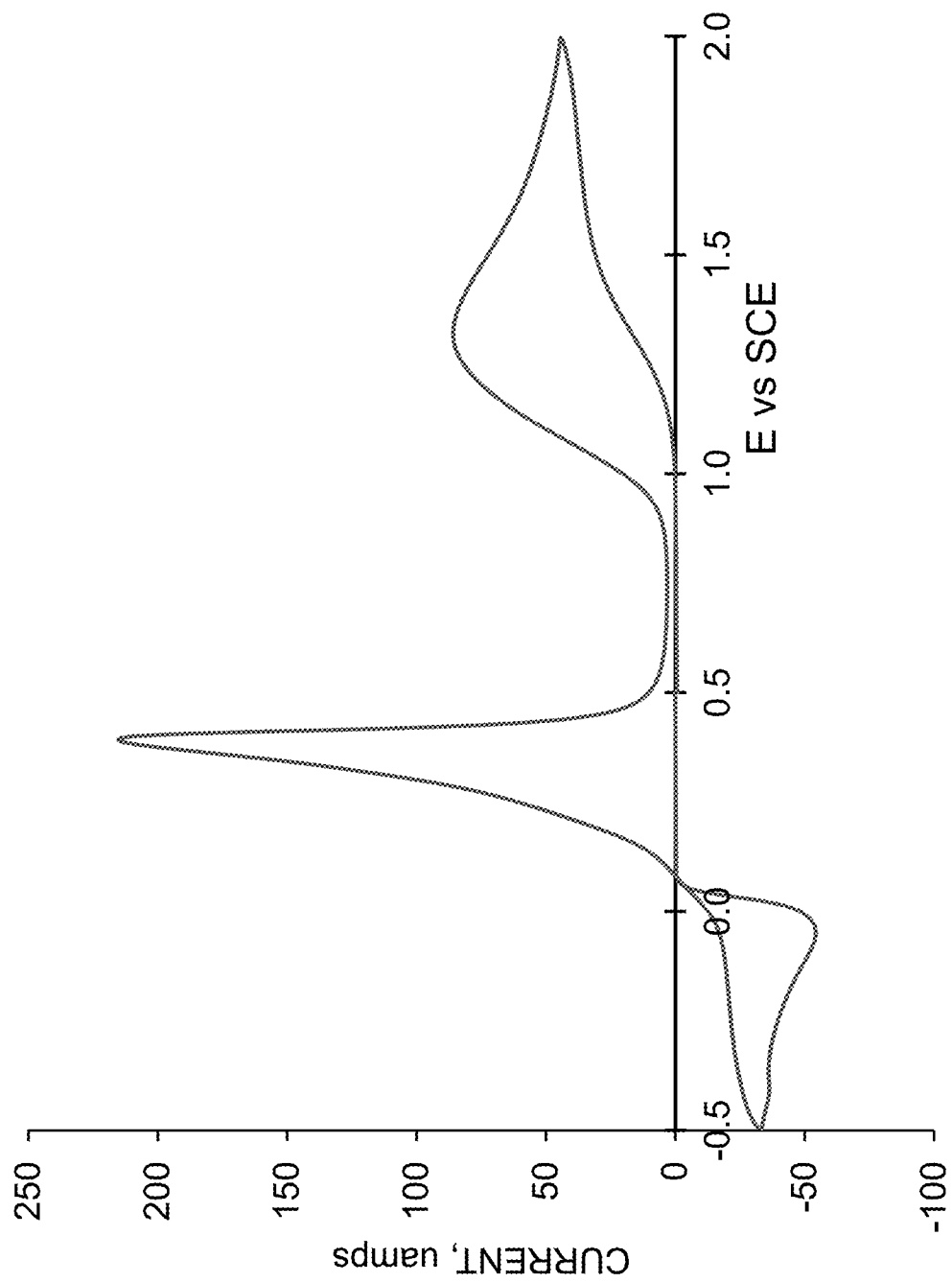
FIG. 4 is a graphical representation of a typical cyclic voltammogram of a silver ion-containing complex as described in I-11 below.

Cyclic voltammograms for other complexes of formula (I) are very similar to that of FIG. 4 peak potentials for the reduction and oxidation of various complexes are shown in TABLE III below. Oxidation potentials determined for the individual α-oxy carboxylate components determined by the experimental method described above are shown in the following TABLE IV. Oxidation potentials for primary alkylamines are found for example in Adenier et al., *Langmuir*, 2004, Vol. 20, pp. 8243-8253.

TABLE III

| Complex | L | P | Structure | Reduction peak Potential | Oxidation peak Potential |
|---|---|---|---|---|---|
| C-1 | iso-butyl acetate | pyridine | 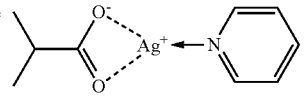 | −0.27 V | +1.07 V |

Voltammetry Results for (Ag$^+$)$_a$(L)$_b$(P)$_c$ in Acetonitrile

TABLE III-continued

Voltammetry Results for $(Ag^+)_a(L)_b(P)_c$ in Acetonitrile

| Complex | L | P | Structure | Reduction peak Potential | Oxidation peak Potential |
|---------|---|---|-----------|--------------------------|--------------------------|
| I-1 | lactate | 2,6-dimethyl pyridine | | −0.21 V | +1.32 V |
| I-4 | hydroxy isobutyl-rate | pyridine | | +0.017 V | +1.13 V |
| | lactate | pyridine | | +0.064 V | +1.21 V |

TABLE IV

Voltammetry Results for Carboxylate Components in Acetonitrile

| L | Oxidation Peak Potential |
|---|--------------------------|
| lactate | +1.1 V |
| acetate | +1.27 V |

I-12: Preparation of Silver 2-Methoxyisobutyrate-Pyridine Complex:

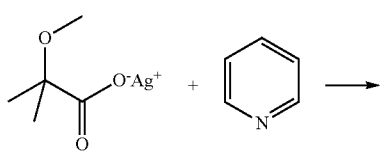

2-Methoxyisobutyric acid was synthesized as follows. A solution of methyl 2-hydroxyisobutyrate (2.0 g, 16.93 mmol) in N,N-dimethylformamide (20 ml) at 0° C. was treated with NaH (60% in mineral oil, 0.813 g, 20.33 mmol), stirred for 30 minutes at 0° C., treated with iodomethane (1.269 ml, 20.29 mmol), allowed to warm to room temperature, and stirred overnight. The resulting solution was diluted with ethyl acetate, quenched with cold saturated ammonium chloride, and extracted with ethyl acetate three times, and the combined organic extractions were washed with saturated $NaHCO_3$, 10% lithium chloride, and sodium chloride, dried over sodium sulfate, and concentrated to dryness to afford 2-methoxy iso-butyrate sodium salt (2.08 g, 93% yield) as characterized by $^1H$ NMR (400 MHz, DMSO-$d_6$): δ 3.64 (s, 3H), 3.11 (s, 3H), 1.30 (s, 6H). 2-Methoxy iso-butyrate silver salt was obtained by the following method described above in Inventive Example 6.

Silver 2-methoxyisobutyrate pyridine complex was then prepared as follows. To a slurry of silver 2-methoxy-isobutyrate as described above (1 g, 4.76 mmol) in acetonitrile (4 ml), pyridine (1.8 g, ~23 mmol) was added to obtain a clear reaction solution that was stirred at 25° C. for 10 minutes to obtain the desired silver 2-methoxyisobutyrate pyridine complex as confirmed by $^1H$ NMR analysis.

I-13: Preparation of Silver Pyruvate Pyridine Complex

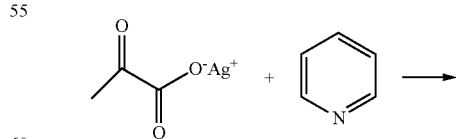

To a solution of pyruvic acid (1.0 g, 11.36 mmol) in acetonitrile (4 ml), pyridine (1.8 g, 23 mmol) was added followed by addition of silver nitrate (1.93 g, 11.37 mmol). The resulting reaction solution was stirred at 25° C. for 10 minutes to obtain the desired silver pyruvate pyridine complex as confirmed by $^1H$ NMR.

I-14: Preparation of Silver 3-Methyl-2-Oxobutanate Pyridine Complex:

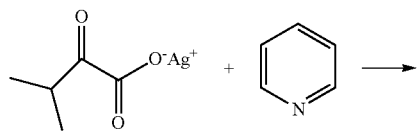

To a solution of 3-methyl-2-oxobutanoic acid (1.0 g, 8.62 mmol) in acetonitrile (4 ml), pyridine 1.5 g, 18 mmol) was added followed by addition of silver nitrate (1.46 g, 8.62 mmol). The resulting reaction solution was stirred at 25° C. for 10 minutes to obtain the desired silver 3-methyl-2-oxobutanate pyridine complex as confirmed by $^1$H NMR.

I-15: Preparation of Silver Lactate 4-Methylpyrimidine Complex:

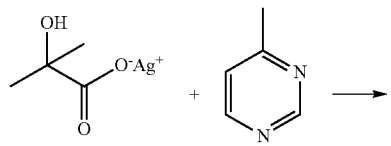

To a slurry of silver lactate (1.0 g, 5.1 mmol) in acetonitrile (4 ml), oxazole (1.84 g, 20.2 mmol) was added to obtain a clear reaction solution that was stirred at 25° C. for 10 minutes to obtain the desired silver lactate 4-methylpyrimidine complex as confirmed by $^1$H NMR (CD$_3$CN) δ 9.06 (s, 1H), 8.61 (d, 1H), 7.37 (d. 1H), 4 (q, 1H), 2.54 (s, 3H), 1.35 (d, 3H).

Invention Example 1: Thermal Generation of Conductive Silver Metal Using 2-Hydroxyisobutyrate Pyridine Complex and Hydroxypropyl Cellulose This example demonstrates the thermal generation of an electrically-conductive silver-containing coating in a product article using a non-aqueous precursor composition according to the present invention.

Figure 5:
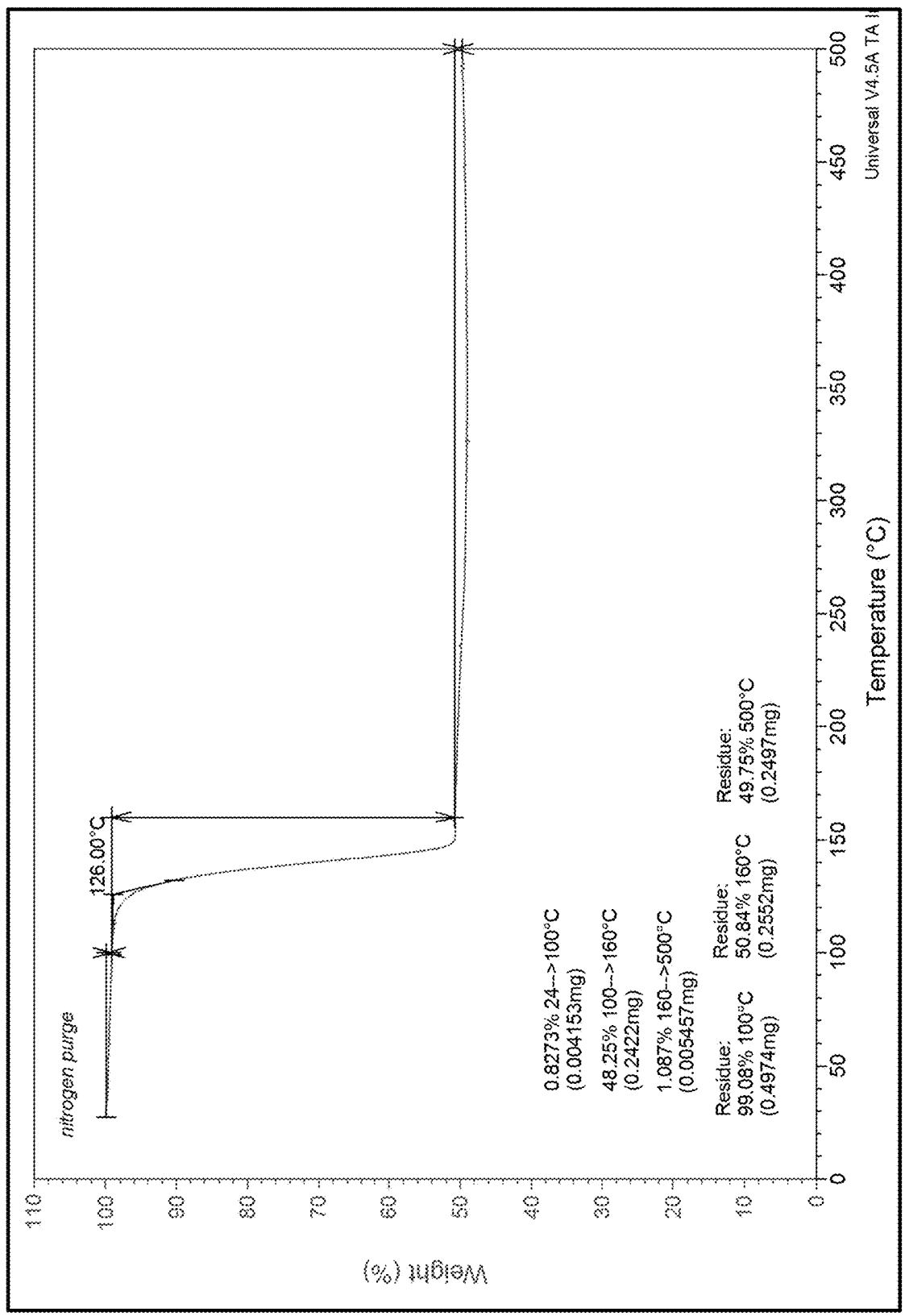
FIG. 5 is a graphical representation of a thermal gravimetric analysis as described below in Invention Example 1.

The silver 2-hydroxyisobutyrate pyridine complex described above as I-4 (0.4 g) was dissolved in acetonitrile (1 ml). Hydroxypropyl cellulose (0.005 g; 1.2 weight %, or 4 weight % based on the total weight of the reducible silver ions) was added and dissolved to form the desired non-aqueous precursor composition at room temperature. This composition was spin coated on a glass plate at 1000 rpm and then placed on a hot plate set at 150° C. for 3-5 minutes and cooled to room temperature. The resistivity of the resulting thermally cured coating was measured using a 4-point probe device and found to be 1-2Ω/□. The heating temperature was decided using thermal gravimetric analysis (TGA) of silver 2-hydroxyisobutyrate-pyridine complex (see FIG. 5) which shows that the onset of thermal decomposition of complex begins near 125° C. and it is complete at 150° C. The surface area of the thermally cured coating was 1 cm$^2$ and its thickness was about 100 nm. The surface morphology and the thickness of the silver-containing film was observed by scanning electron microscopy (SEM). Adhesion of the silver-containing coating to a glass substrate was found to be good as measured by adhesive tape test.

Inventive Example 2: Printing and Thermal Generation of Conductive Silver Metal Using 2-Hydroxyisobutyrate Pyridine Complex and Hydroxypropyl Cellulose A flexographic printing plate was obtained from a commercially available Kodak Flexcel NX photopolymer plate (precursor) using a flexographic IGT F1 printer. A relief image was provided by imaging the photopolymer plate through a mask that was written using the Kodak Square Spot laser technology at a resolution of 12,800 dpi. Test patterns of the non-aqueous precursor composition described above in Invention Example 1 were printed onto a glass substrate to provide a precursor article with thermally-sensitive thin film patterns. The precursor article was heated at 150° C. for 3-5 minutes to obtain a silver metal-containing film that was determined to have a sheet resistivity in the product article of 1-2Ω/□. Adhesion of the silver-containing coating to the glass substrate was found to be good as measured by an adhesive tape test.

Invention Example 3: Thermal Generation of Conductive Silver Metal Using 2-Hydroxyisobutyrate Pyridine Complex and Poly(Vinyl Acetate)

This example demonstrates the thermal generation of an electrically-conductive silver-containing coating in a product article using a non-aqueous precursor composition according to the present invention.

The silver 2-hydroxyisobutyrate pyridine complex described above as I-4 (1.54 g) was dissolved in acetonitrile (2 ml). Poly(vinyl acetate) (0.04 g; 2.5 weight %, or 9 weight % based on the total weight of reducible silver ions) was added and dissolved to form the desired non-aqueous precursor composition at room temperature. This composition was spin coated on a glass plate at 1000 rpm and then placed on a hot plate set at 150° C. for heating at 150° C. for 3-5 minutes. It was then cooled to room temperature and its sheet resistivity was measured using 4-point probe device to be 0.6Ω/□. The area of the silver-containing coating was 1 cm$^2$ and its thickness was about 100 nm. The surface morphology and the thickness of the silver-containing film in the product article was observed by scanning electron microscopy (SEM) and adhesion of the silver-containing coating to the glass substrate was found to be good as measured by an adhesive tape test.

Invention Example 4: Thermal Generation of Conductive Silver Metal Using 2-Hydroxyisobutyrate Pyridine Complex and Poly(methyl methacrylate-co-hydroxyethyl acrylate)

This example demonstrates the thermal generation of an electrically-conductive silver coating in a product article using a non-aqueous precursor composition according to the present invention.

The silver 2-hydroxyisobutyrate pyridine complex described above as I-4 (0.6 g) was dissolved in acetonitrile (1 ml). Poly(methyl methacrylate-co-hydroxyethyl acrylate) (0.002 g; 0.33 weight %, or 1.1 weight % based on the total weight of reducible silver ions) was added and dissolved to form the desired non-aqueous precursor composition at room temperature. This composition was spin coated on a glass plate at 1000 rpm and then placed on a hot plate set at 150° C. The composition was heated at 150° C. for 3-5 minutes and then cooled to room temperature. The sheet resistivity of the resulting thermally-cured coating was measured using 4-point probe device and found to be 1-2Ω/□. The area of the coating was 1 cm² and its thickness was about 100 nm. The surface morphology and the thickness of the silver-containing film was observed by scanning electron microscopy (SEM). Its adhesion to a glass substrate was found to be good as measured by an adhesive tape test.

Invention Example 5: Thermal Generation of Conductive Silver Metal Using 2-Hydroxyisobutyrate Pyridine Complex and Poly(methyl methacrylate-co-2-chloroethyl methacrylate-co-hydroxyethyl methacrylate)

This example demonstrates the thermal generation of an electrically-conductive silver-containing coating using a non-aqueous precursor composition according to the present invention.

The silver 2-hydroxyisobutyrate pyridine complex described above as I-4 (1.54 g) was dissolved in acetonitrile (2 ml). Poly(methyl metacrylate-co-2-chloroethyl methacrylate-co-hydroxyethyl methacrylate) (0.04 g; 2.5 weight %, or 9 weight % based on the total weight of reducible silver ions) was added and dissolved to form the desired non-aqueous precursor composition at room temperature. This composition was spin coated on a glass plate at 1000 rpm and then placed on a hot plate set at 150° C. The coating was heated at 150° C. for 3 minutes and then cooled to room temperature. Its sheet resistivity was measured using 4-point probe device and found to be 0.6Ω/□. The area of the coating was 1 cm² and its thickness was about 100 nm. The surface morphology and the thickness of the silver-containing film was observed by scanning electron microscopy (SEM) and its adhesion to the glass substrate was found to be good as measured by adhesive tape test.

The invention has been described in detail with particular reference to certain preferred embodiments thereof, but it will be understood that variations and modifications can be effected within the spirit and scope of the invention.

The invention claimed is:

1. An article comprising a substrate that is composed of a treated or untreated glass, silicon or a ceramic material, continuous flexible web of a polyester film, or a continuous transparent polyester, which substrate has a first supporting side and a second opposing supporting side, and further comprising on one or both of the first supporting side and the second opposing supporting side:
one or more electrically-conductive silver metal containing patterns, each consisting essentially of:
silver metal;
an α-oxy carboxylate that is represented by the following formula (II):

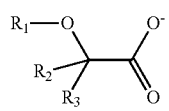

(II)

wherein $R_1$, $R_2$, and $R_3$ are independently hydrogen or branched or linear alkyl groups, or by the following formula (III):

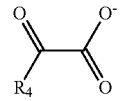

(III)

wherein $R_4$ is a branched or linear alkyl group having 1 to 8 carbon atoms and any of the hydrogen atoms in the $R_4$ branched or linear alkyl group optionally can be replaced with a fluorine atom;
a 5- or 6-membered N-heteroaromatic compound that is selected a from the group consisting of pyridine, 2-methylpyridine, 4-methylpyridine, 2,6-dimethylpyridine, 2,3-dimethylpyridine, 3,4-dimethylpyridine, 4-dimethylpyridine, 3-chloropyridine, 3-fluoropyridine, oxazole, 4-methyloxazole, isoxazole, 3-methylisoxazole, pyrimidine, pyrazine, pyridazine, and thiazole; and
a polymer that is either (i) a hydroxy-containing cellulosic polymer selected from the group consisting of hydroxyprolyl methylcellulose, hydroxypropyl cellulose, hydroxyethyl cellulose, and mixtures thereof, or (ii) a non-cellulosic acrylic polymer having a halo- or hydroxy-containing side chain.

2. The article of claim 1, wherein the (ii) non-cellulosic acrylic polymer comprises recurring units derived from one or more (meth)acrylates, at least one of which (meth)acrylates comprises a halo- or hydroxy-containing side chain.

3. The article of claim 1, wherein the 5- or 6-membered N-heteroaromatic compound is selected from the group consisting of pyridine, 2-methylpyridine, 4-methylpyridine, 2,5-dimethylpyridine, 2,3-dimethylpyridine, 3,4-dimethylpyridine, 3-chloropyridine, and 3-fluoropyridine.

4. The article of claim 1, wherein each of the one or more electrically-conductive silver metal-containing thin film patterns has a sheet resistivity of less than 1000 ohms/□ as measured using a 4-point probe device.

5. The article of claim 1, wherein each of the one or more electrically-conductive silver metal-containing thin film patterns has a sheet resistivity of less than 500 ohms/□ as measured using a 4-point probe device.

6. The article of claim 1, wherein the substrate is a glass or ceramic material.

7. The article of claim 1, wherein the substrate is a continuous polymeric web.

8. The article of claim 7, wherein the substrate is a continuous transparent polyester film.

9. The article of claim 1, wherein $R_1$ is hydrogen or a branched or linear alkyl group having 1 to 3 carbon atoms, and $R_2$ and $R_3$ are independently branched or linear alkyl groups having 1 to 8 carbon atoms, wherein any of the hydrogen atoms in the $R_1$, $R_2$, and $R_3$ branched or linear alkyl groups optionally can be replaced with a fluorine atom.

10. The article of claim 1 comprising on one or both of the first supporting side and the second supporting side, two or more of the electrically-conductive silver metal patterns.

11. The article of claim 1, wherein the substrate has a dry thickness of at least 0.008 mm and up to and including 02 mm.

* * * * *